(12) United States Patent
Lee

(10) Patent No.: US 11,758,377 B2
(45) Date of Patent: Sep. 12, 2023

(54) VEHICLE TERMINAL FOR CONTROLLING V2X MESSAGE TRANSMISSION BETWEEN VEHICLE TERMINALS THROUGH V2X SERVICE IN WIRELESS COMMUNICATION SYSTEM AND COMMUNICATION CONTROL METHOD THEREOF

(71) Applicant: LG ELECTRONICS INC., Seoul (KR)

(72) Inventor: Ki-Dong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 404 days.

(21) Appl. No.: 17/046,586

(22) PCT Filed: Apr. 24, 2019

(86) PCT No.: PCT/KR2019/004970
§ 371 (c)(1),
(2) Date: Oct. 9, 2020

(87) PCT Pub. No.: WO2019/209032
PCT Pub. Date: Oct. 31, 2019

(65) Prior Publication Data
US 2021/0112386 A1    Apr. 15, 2021

Related U.S. Application Data

(60) Provisional application No. 62/662,171, filed on Apr. 24, 2018.

(51) Int. Cl.
*H04W 4/40* (2018.01)
*B60W 60/00* (2020.01)
(Continued)

(52) U.S. Cl.
CPC ............ *H04W 4/40* (2018.02); *B60W 60/005* (2020.02); *G05D 1/0022* (2013.01);
(Continued)

(58) Field of Classification Search
None
See application file for complete search history.

(56) References Cited

U.S. PATENT DOCUMENTS 9,805,601 B1 * 10/2017 Fields .................. G08G 1/166
2017/0245245 A1    8/2017 Kim et al.
2017/0371349 A1   12/2017 Kim et al.

FOREIGN PATENT DOCUMENTS

KR    1020100098929           9/2010
KR      20100098929 A  * 10/2010 ........... H04L 47/283
KR    1020100128422          12/2010

OTHER PUBLICATIONS

3GPP TS 23.501 V15.1.0. 3GPP; TSG SA: System Architecture for the 5G System; Stage 2 (Release 15), Mar. 28, 2018, see sections 5.17.1.1, 6.2.5.

* cited by examiner

Primary Examiner — Abdhesh K Jha
(74) Attorney, Agent, or Firm — BRYAN CAVE LEIGHTON PAISNER LLP

(57) ABSTRACT

Disclosed herein is a communication control method of a vehicle user equipment (UE) for controlling vehicle-to-everything (V2X) message transmission between vehicle UEs through a V2X service in a wireless communication system. The communication control method of the vehicle UE includes receiving a V2X message from a first external vehicle UE, determining whether the V2X message is transmitted to a second external vehicle UE located in a coverage area of the vehicle UE, based on relaying information indicating whether the V2X message is relayed, and trans-
(Continued)

mitting the V2X message to the second external vehicle UE, upon determining that the V2X message is transmitted to the second external vehicle UE. The relaying information includes at least one of active status information, relay probability information or residual life information.

18 Claims, 17 Drawing Sheets

(51) Int. Cl.
      *G05D 1/00*       (2006.01)
      *H04W 88/04*      (2009.01)

(52) U.S. Cl.
      CPC ....... *G05D 1/0061* (2013.01); *B60W 2556/45* (2020.02); *B60W 2756/10* (2020.02); *H04W 88/04* (2013.01)

(a)

(b)

(a)

(b)

(a)

(b)

(a)

(b)

VEHICLE TERMINAL FOR CONTROLLING
V2X MESSAGE TRANSMISSION BETWEEN
VEHICLE TERMINALS THROUGH V2X
SERVICE IN WIRELESS COMMUNICATION
SYSTEM AND COMMUNICATION
CONTROL METHOD THEREOF

BACKGROUND OF THE INVENTION

This application is the National Stage filing under 35 U.S.C. 371 of International Application No. PCT/KR2019/004970, filed on Apr. 24, 2019, which claims the benefit of U.S. Provisional Application No. 62/662,171, filed on Apr. 24, 2018, the contents of which are all hereby incorporated by reference herein in their entirety.

1. Field of the Invention

The present disclosure relates to a wireless communication system for performing communication between vehicle user equipments (UEs) through a vehicle-to-everything (V2X) service and, more particularly, to a vehicle UE for controlling V2X message transmission between vehicle UEs through a V2X service in a wireless communication system and a communication control method thereof.

2. Description of the Related Art

3GPP Release 15 standardization work (eV2X: enhanced V2X, TS 22.186) of a vehicle-to-everything (V2X) service, which follows 3GPP Release 14 standardization work (V2XLTE, TS22.185) of a V2X service, specifies requirements for the V2X service. In particular, the eV2X standardization work deals with specific implementation cases of V2X services expected to occur in 5G and post-5G wireless communication systems. Through 3GPP Release 14 and 15 standardization works of V2X services, multiple communication technologies such as vehicle-to-vehicle (V2V), vehicle-to-infra (V2I), vehicle-to-network (V2N), vehicle-to-pedestrian (V2P), etc. tend to be integrated into V2X services.

3GPP Release 14 and 15 standardization works of V2X services progress in association with the world standard of the Standard Development Organizations (SDOs) such as European Telecommunications Standards Institute-Intelligent Transport Systems (ETSI-ITS), Society of Automotive Engineers (SAE), 5G Automotive Association (SGAA), etc. V2X services may be developed in association with various wireless communication systems which have been commercialized or will be commercialized, and a demand for efficient communication services using V2X services is increasing.

SUMMARY OF THE INVENTION

An object of the present disclosure devised to solve the problem lies in a method of performing communication between vehicle user equipments (UEs) through a vehicle-to-everything (V2X) service and a vehicle UE for performing the same.

Another object of the present disclosure devised to solve the problem lies in a method of transmitting a V2X message between vehicle user equipments (UEs) through a V2X service in a wireless communication system and a vehicle UE for performing the same.

Another object of the present disclosure devised to solve the problem lies in a vehicle UE for dynamically controlling a relaying method which is one of methods of transmitting a V2X message between vehicle user equipments (UEs) through a V2X service in a wireless communication system, and a communication control method thereof.

According to an embodiment of the present disclosure, a communication control method of a vehicle user equipment (UE) for controlling vehicle-to-everything (V2X) message transmission between vehicle UEs through a V2X service in a wireless communication system, the communication control method comprising: receiving a V2X message from a first external vehicle UE; determining whether the V2X message is transmitted to a second external vehicle UE located in a coverage area of the vehicle UE, based on relaying information indicating whether the V2X message is relayed; and transmitting the V2X message to the second external vehicle UE, upon determining that the V2X message is transmitted to the second external vehicle UE, wherein the relaying information includes at least one of active status information, relay probability information or residual life information.

According to an embodiment of the present disclosure, the first external vehicle UE is in a V2X-network exposure function (NEF) active status, and when the vehicle UE is located in a coverage area of the first external vehicle UE, the V2X message is received from the first external vehicle UE.

According to an embodiment of the present disclosure, when the V2X message is received from the first external vehicle UE, the coverage area of the vehicle UE is smaller than a normal coverage area of the vehicle UE.

According to an embodiment of the present disclosure, the relaying information includes the residual life information, and the residual life information is acquired from the received V2X message, the determining of whether the V2X message is transmitted further comprises subtracting, by a positive integer of 1, a value of a residual life indicated by the residual life information, and when the reduced value of the residual life is greater than 0, the V2X message including the reduced value of the residual life is transmitted to the second external vehicle UE.

According to an embodiment of the present disclosure, when the reduced value of the residual life is not greater than 0, the V2X message is not transmitted to the second external vehicle UE.

According to an embodiment of the present disclosure, wherein the relaying information includes the active status information, wherein the active status information indicates whether the vehicle UE is in the V2X-NEF active status, and wherein whether the V2X message is transmitted to the second external vehicle UE is determined based on whether the vehicle UE is in the V2X-NEF active status.

According to an embodiment of the present disclosure, the relaying information includes the residual life information, the residual life information is acquired from the received V2X message, the determining of whether the V2X message is transmitted further comprises subtracting, by a positive integer of 1, a value of a residual life indicated by the residual life information, and when the vehicle UE is in the V2X-NEF active status and the reduced value of the residual life is greater than 0, the V2X message including the reduced value of the residual life is transmitted to the second external vehicle UE.

According to an embodiment of the present disclosure, the relaying information includes the relay probability information, the relay probability information indicates an event value in a sample space for the V2X message in a predetermined probability distribution defined using [0, 1] as the sample space, and whether the V2X message is transmitted to the second external vehicle UE is determined based on whether the event value is equal to or greater than a predetermined threshold.

According to an embodiment of the present disclosure, the relaying information includes the relay probability information, the relay probability information indicates an event value in a sample space for the V2X message in a predetermined probability distribution defined using [0, 1] as the sample space, and whether the V2X message is transmitted to the second external vehicle UE is determined based on whether the event value is equal to or greater than a predetermined threshold.

According to an embodiment of the present disclosure, the predetermined probability distribution includes at least one of a uniform distribution, a meta function distribution, an exponential function distribution or a log function distribution.

According to an embodiment of the present disclosure, the relaying information includes the residual life information, the residual life information is acquired from the received V2X message, the determining of whether the V2X message is transmitted further comprises subtracting, by a positive integer of 1, a value of a residual life indicated by the residual life information, and when the event value is equal to or greater than the predetermined threshold and the reduced value of the residual life is greater than 0, the V2X message is transmitted to the second external vehicle UE.

According to an embodiment of the present disclosure, when the vehicle UE is in the V2X-NEF active status, the event value is equal to or greater than the predetermined threshold, and the reduced value of the residual life is greater than 0, the V2X message is transmitted to the second external vehicle UE.

According to an embodiment of the present disclosure, the V2X message include a basic safety message (BSM).

According to an embodiment of the present disclosure, a vehicle user equipment (UE) for controlling vehicle-to-everything (V2X) message transmission between vehicle UEs through a V2X service in a wireless communication system, the vehicle UE comprising: a transceiver configured to transmit and receive signals to and from external vehicle UEs; and at least one processor, wherein the at least one processor: controls the transceiver to receive a V2X message from a first external vehicle UE; determines whether the V2X message is transmitted to a second external vehicle UE located in a coverage area of the vehicle UE, based on relaying information indicating whether the V2X message is relayed; and controls the transceiver to transmit the V2X message to the second external vehicle UE, upon determining that the V2X message is transmitted to the second external vehicle UE, and wherein the relaying information includes at least one of active status information, relay probability information or residual life information.

According to an embodiment of the present disclosure, a wireless communication system for dynamic relaying control of vehicle-to-everything (V2X) message transmission between vehicle UEs through a V2X service, the wireless communication system comprising: a first vehicle UE including a first transceiver configured to transmit and receive signals to external vehicle UEs, and a first processor configured to control the first transceiver to transmit a V2X message to a second vehicle UE; a second vehicle UE including a second transceiver configured to transmit and receive signals to external vehicle UEs, and a second processor configured to control the second transceiver to receive the V2X message from the first external vehicle UE, to determine whether the V2X message is transmitted to a third vehicle UE located in a coverage area, based on relaying information indicating whether the V2X message is relayed, and to control the second transceiver to transmit the V2X message to the third vehicle UE, upon determining that the V2X message is transmitted to the third vehicle UE; and a third vehicle UE including a third transceiver configured to transmit and receive signals to external vehicle UEs, and a third processor configured to control the third transceiver to receive the V2X message from the second vehicle UE, wherein the relaying information includes at least one of active status information, relay probability information or residual life information.

DESCRIPTION OF THE PREFERRED EMBODIMENTS

Figure 1:
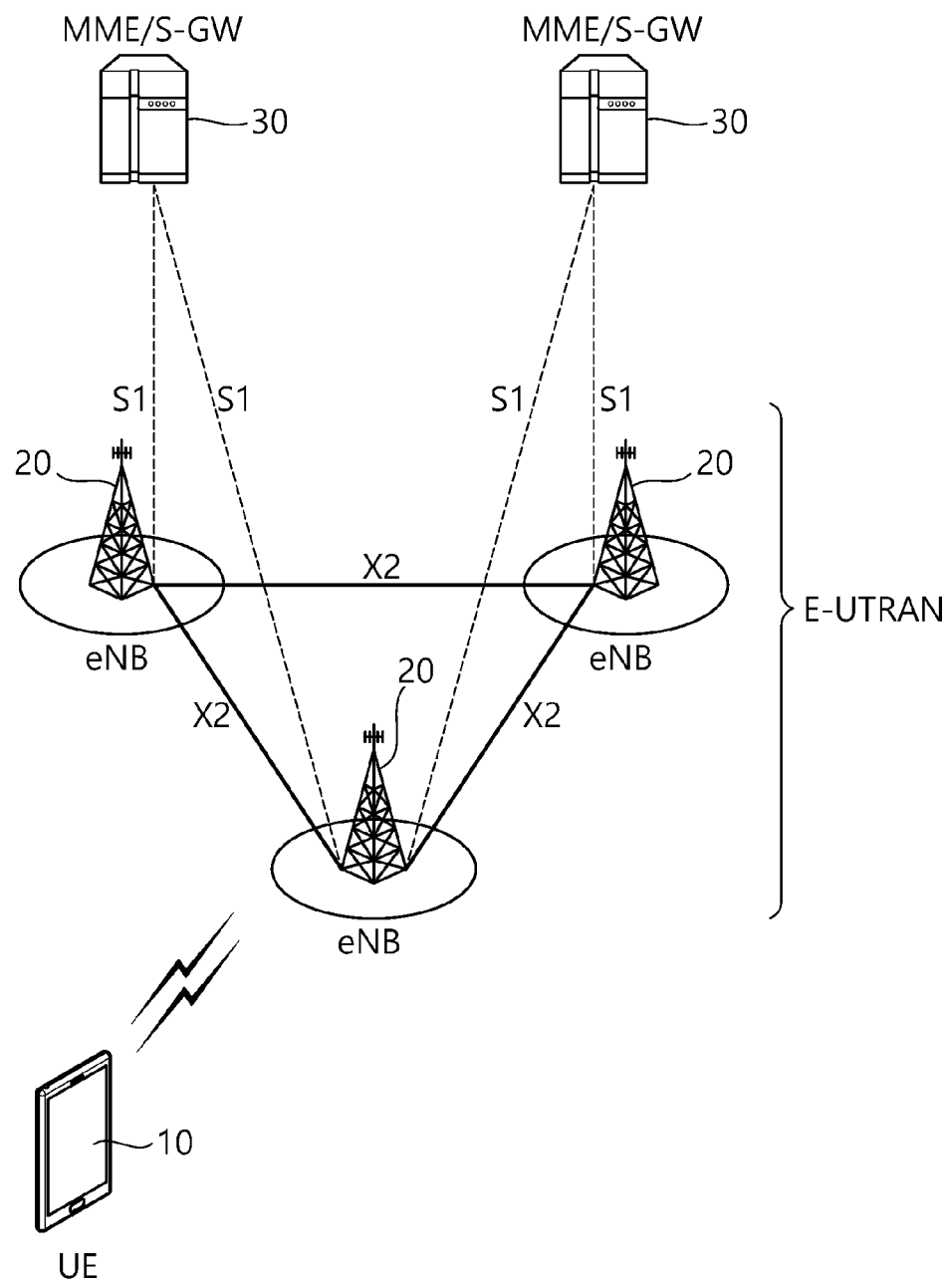
FIG. 1 is a view showing an example of the architecture of a wireless communication system.

In the disclosure, embodiments are described in detail with reference to the accompanying drawings so that those of ordinary skill in the art to which the disclosure pertains can easily implement. However, the disclosure may be implemented in various forms and is not limited to the embodiments described herein. In addition, in order to clearly describe the disclosure in the drawings, a description of a known structure or function has been omitted or a description has been simplified, and similar reference numerals are attached to similar parts throughout the specification.

The accompanying drawings may be schematically illustrated to describe an embodiment of the disclosure, and some dimensions may be exaggerated for clearer expression. Similarly, a significant portion of the drawings can be represented arbitrarily.

In this disclosure, a base station (BS) may mean a terminal node of a network that directly communicates with the terminal. In some cases, certain operations described as being performed by the base station may be performed by an upper node of the base station. In other words, in a network composed of a plurality of network nodes including a base station, various operations to be performed for communication with a terminal may be performed by the base station or a network node other than the base station. The base stations are "fixed station", "eNodeB (eNB: evolved-NodeB)", "Node B", "BTS (Base transceiver system)", "AP (Access Point)", "Macro eNode B", It may be a concept encompassing the meanings of terms such as "master eNode B" and "gNodeB (gNB)", and may be replaced by one of these terms in some cases.

In this disclosure, "terminal (UE: User Equipment)" refers to "Vehicle User Equipment", "terminal", "Mobile Station (MS)", "User Terminal (UT).)", "Mobile Subscriber Station (MSS)", "SS (Subscriber Station)", and "Wireless Device" may be a concept encompassing the meanings of these terms. Can be replaced by one of the terms.

In this disclosure, singular expressions include plural expressions unless the context clearly indicates otherwise. In the present disclosure, terms such as "comprise" or "have" are intended to designate the presence of features, numbers, steps, actions, components, parts, or combinations thereof described in the specification, but one or more other features. It is to be understood that the presence or addition of elements or numbers, steps, actions, components, parts, or combinations thereof, does not preclude in advance.

Hereinafter, the disclosure will be described in detail with reference to the accompanying drawings.

FIG. 1 is a view showing an example of the architecture of a wireless communication system. The wireless communication system shown in FIG. 1 may correspond to an Evolved-UMTS Terrestrial Radio Access Network (E-UTRAN), Long Term Evolution (LTE), LTE-A, NR, or 5G system.

The E-UTRAN includes base stations (BSs) 20 which provide a control plane and a user plane to a user equipment (UE) 10. The BSs 20 may be interconnected by means of an X2 interface. The BSs 20 are connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
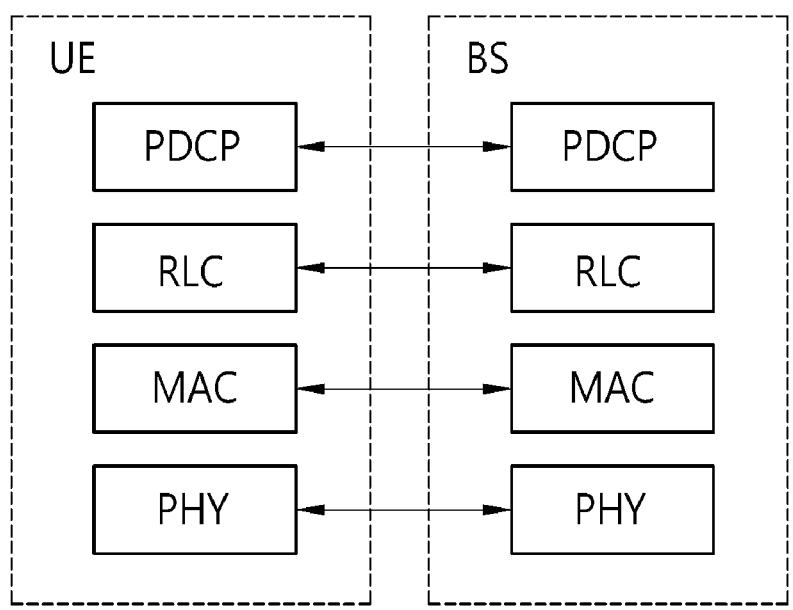
FIG. 2 is a block diagram showing a radio protocol architecture for a user plane.
Figure 3:
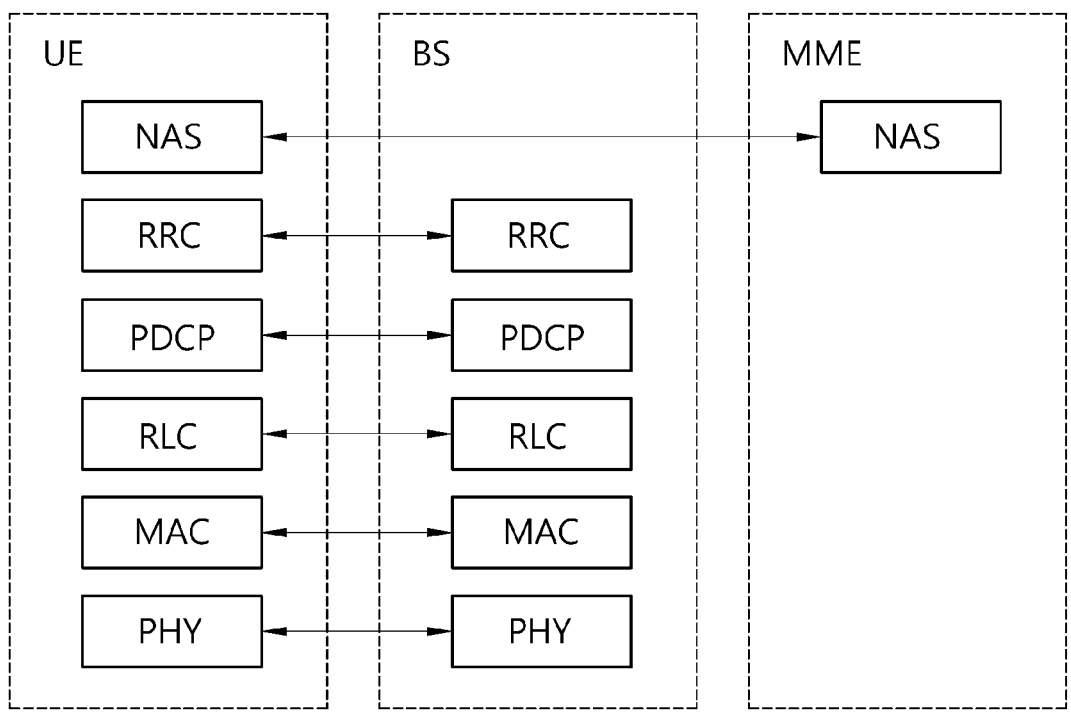
FIG. 3 is a block diagram showing a radio protocol architecture for a control plane.

FIG. 2 is a block diagram showing a radio protocol architecture for a user plane. FIG. 3 is a block diagram showing a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a procedure of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel A Transmission Time Interval (TTI) is a unit time for subframe transmission.

Hereinafter, a new radio access technology (new RAT) will be described. The new RAT may be abbreviated as new radio (NR).

As more communication devices demand larger communication capacities, there is a need for improved mobile broadband communication as compared to the existing radio access technologies (RAT). Massive machine type Communications (MTC), which connects multiple devices and objects to provide various services anytime and anywhere, is also one of the major issues to consider in next-generation communication. In addition, communication system design considering services/terminals that are sensitive to reliability and latency has been discussed. The introduction of next-generation wireless access technologies considering such enhanced mobile broadband communication, massive MTC, ultra-reliable and low latency communication (URLLC), and the like, has been discussed, and the corresponding technology is referred to as new RAT or NR for the convenience sake in the present disclosure.

Figure 4:
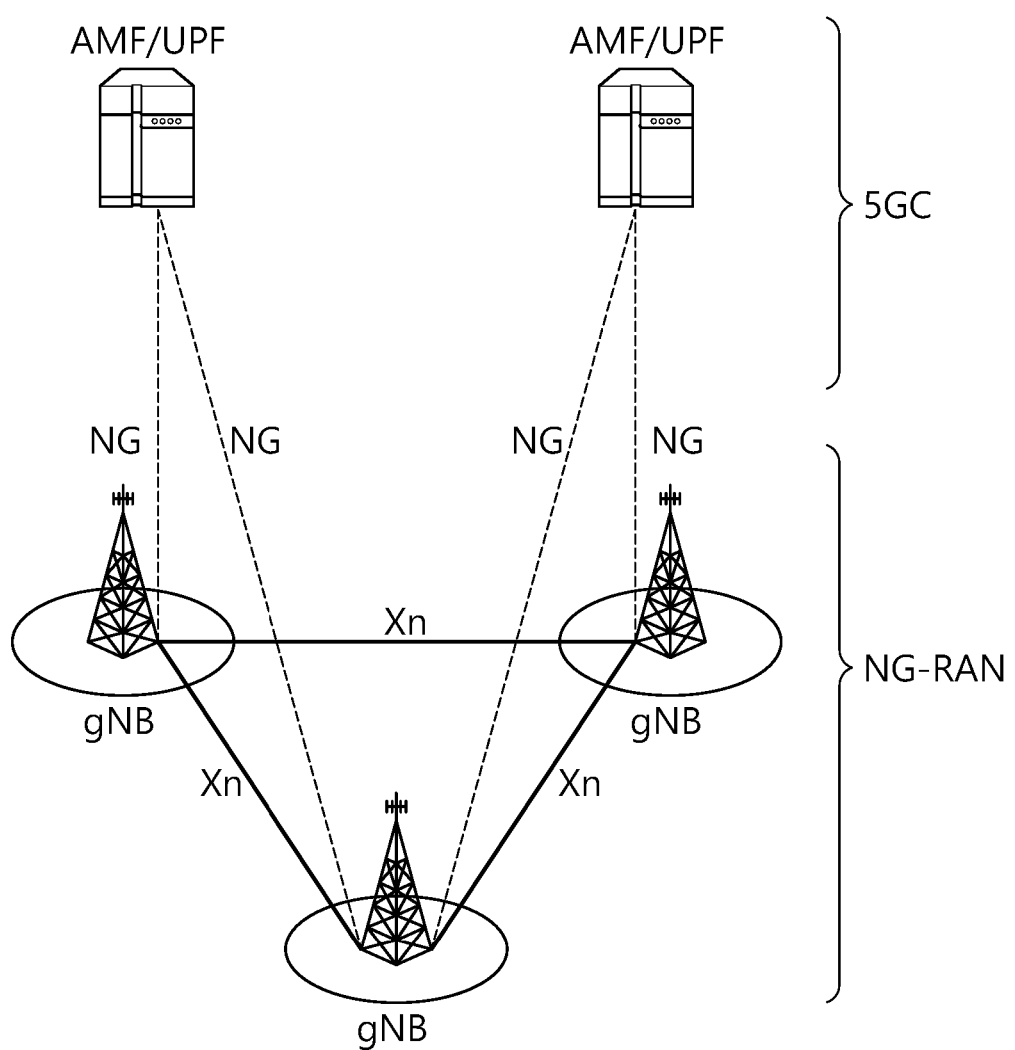
FIG. 4 is a view showing a system architecture of a new generation radio access network (NG-RAN), to which new radio (NR) is applied.

FIG. 4 is a view showing a system architecture of a new generation radio access network (NG-RAN), to which new radio (NR) is applied.

Referring to FIG. 4, the NG-RAN may include a gNB and/or an eNB providing a user plane and a control plane protocol termination to a terminal FIG. 4 illustrates a case of including only the gNB. The gNB and eNB are connected to each other by an Xn interface. The gNB and eNB are connected to a 5G Core Network (5 GC) through an NG interface. More specifically, the gNB and eNB are connected to the access and mobility management function (AMF) through an NG-C interface and connected to a user plane function (UPF) through an NG-U interface.

Figure 5:
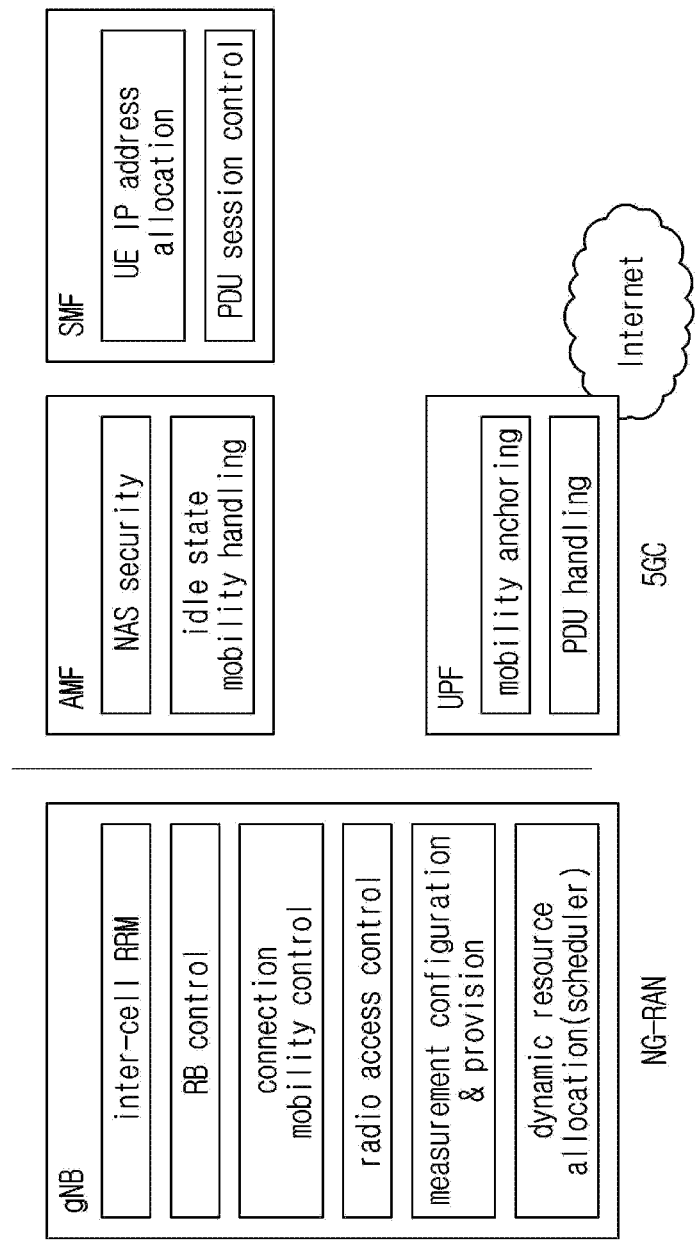
FIG. 5 is a functional division between NG-RAN and a 5G core network (5GC).

FIG. 5 is a functional division between NG-RAN and a 5G core network (5GC).

Referring to FIG. 5, the gNB may provide inter-cell radio resource management (RRM), radio bearer (RB) control, connection mobility control, radio access control, measurement configuration & provision, dynamic resource allocation, and the like. An AMF may provide functions such as NAS security, idle state mobility handling, and the like. A UPF may provide functions such as mobility anchoring, PDU handling, and the like. A session management function (SMF) may provide functions such as UE IP address allocation, PDU session control, and the like.

Figure 6:
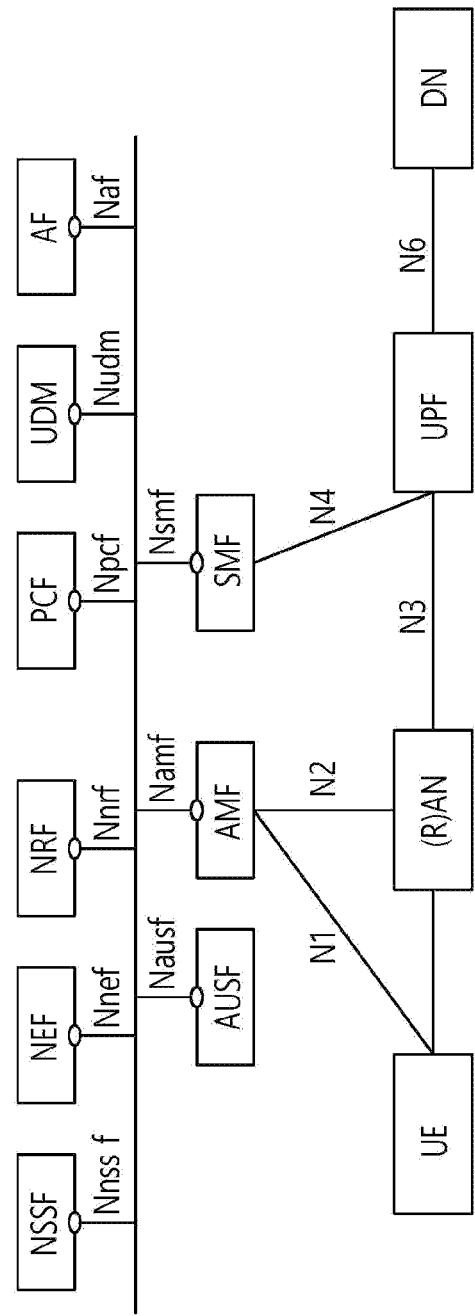
FIG. 6 is a view showing the architecture of a 5G wireless communication system according to an embodiment.

FIG. 6 is a view showing the architecture of a 5G wireless communication system according to an embodiment.

The architecture of the 5G wireless communication system shown in FIG. 6 includes a network slice selection function (NSSF), a network exposure function (NEF), an NF repository function (NRF), a policy control function (PCF), unified data management (UDM), an application function (AF), an authentication server function (AUSF), an access and mobility management function (AMF), a session management function (SMF), a user equipment (UE), a (R)AN, a user plane function (UPF) and a data network (DN). Through FIG. 6, paths, through which the NEF, the AMF and the UE transmit and receive signals to and from each other, can be seen.

The NEF may support external exposure of services and capabilities provided by 3GPP network functions.

When the NEF is used in communication through a V2X service, the vehicle UE may acquire movement change information of external entities such as external vehicle UEs, UEs, infrastructure, etc., LTE-NR communication coverage area change information and geography change information. The vehicle UE may efficiently transmit and receive signals to and from a plurality of external entities requesting different services based on acquired information on the external entities. For example, the vehicle UE may transmit and receive signals to and from the external entities through a relaying method based on the acquired information on the external entities.

External exposure may be classified into monitoring capability, provisioning capability and policy/charging capability. However, the capabilities included in external exposure are not limited thereto.

Monitoring capability is to monitor specific events related to UEs in the 5G wireless communication system and to externally expose the events monitored through the NEF. Examples of the events monitored through the NEF are shown in Table 1 below.

TABLE 1

| Event | Details | Network Function (NF) for detecting event |
|---|---|---|
| Loss of connectivity | The network detects that the UE cannot perform signaling or user plane communication. | AMF |
| Location reporting | Location reporting indicates the current location or the last known location of the UE. One-time or persistent location reporting is supported for the current location. For persistent location reporting, a serving node may transmit a notification according to a period determined based on allowable location accuracy. One-time location reporting may be supported to only indicate the last known location. | AMF |
| Change of SUPI-PEI association | It represents change in PEI (IMEI (SV)) of ME using a specific SUPI. | UDM |
| Roaming status | Notification of the current roaming status (whether a serving PLMN and/or a UE is an HPLMN) and status change of the UE | UDM |
| Communication failure | It is identified by RAN/NAS release code. | AMF |
| Availability after DNN failure | It indicates a point of time when data transmission fails after the UE enters a communication status. | AMF |
| Number of UEs present in a geographical area) | It indicates the number of UEs present in a geographical area depicted by an AF. The AF may request that UEs recognized by a system during normal operation be present in the geographical area (the last known location) or the system search for UEs present in the geographical area. | AMF |

Provisioning capability is to allow information which may be used by the UE in the 5G wireless communication system to be supplied to an external party.

Policy/charging capability is to deal with QoS and charging policy based on a request from an external party.

Figure 7:
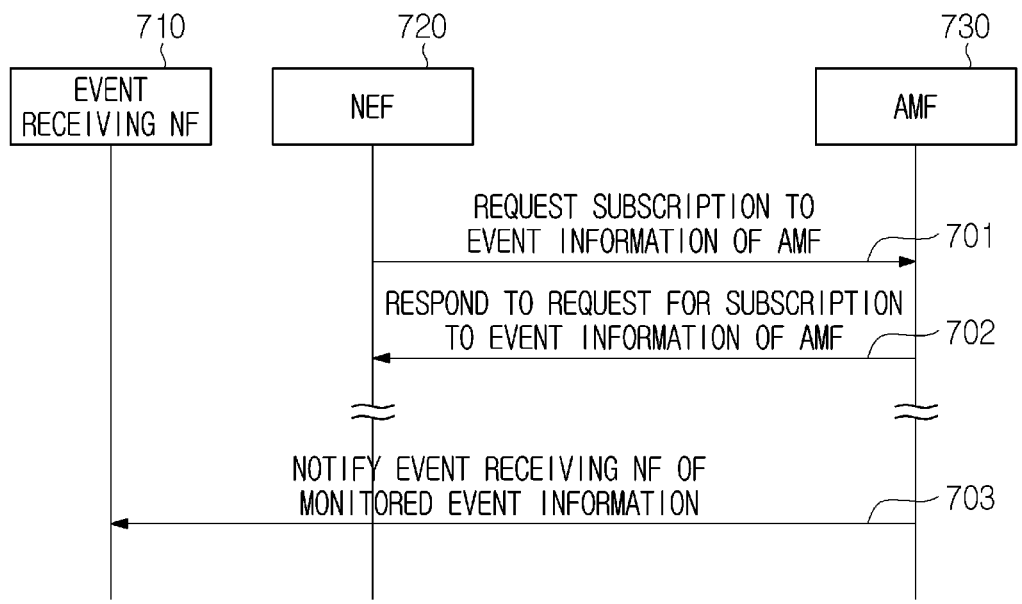
FIG. 7 is a flowchart illustrating a process of transmitting and receiving signals among a network exposure function (NEF), an access and mobility management function (AMF) and an event receiving network function (NF) according to an embodiment.

FIG. 7 is a flowchart illustrating a process of transmitting and receiving signals among a network exposure function (NEF), an access and mobility management function (AMF) and an event receiving network function (NF) according to an embodiment.

In step 701, the NEF 720 may request subscription to event information of the AMF 730 from the AMF 730. For example, the NEF 720 may request subscription to the event identification (ID) of the AMF 730 from the AMP' 730. The NEF 720 requesting subscription to the event information of the AMF 730 may be, for example, referred to as Namf_EventExposure_Subscribe Request.

In step 702, the AMF 730 may transmit, to the NEF 720, a response to the request for subscription to the event information of the AMF 730, which has received from the NEF 720. For example, the AMF 730 may transmit, to the NEF 720, a signal indicating that the request for subscription to the event information of the AMF 730 has been normally received from the NEF 720. The response to the request for subscription to the event information of the AMF 730, which has been received from the NEF 720, may be, for example, referred to as Namf_EventExposure_Subscribe Response.

In step 703, the AMF 730 may notify an event receiving NF 710 of monitored event information. For example, the AMF 730 may notify the event receiving NF 710 of monitored event IDs. The AMF 730 notifying the event receiving NF 710 of the monitored event information may be, for example, referred to as Namf_EventExposure_Notify.

The event receiving NF 710 may be an arbitrary network function (NF). For example, an eNode B (eNB), a gNB, etc. may perform operation of the event receiving NF 710. In some cases, the NEF 720 may also perform operation of the event receiving NF 710.

The event information received by the event receiving NF 710 from the AMP 730 may include, for example, information on the status of the NEF 720. When the event receiving NF 710 is an eNB or a gNB, the eNB or the gNB may notify the vehicle UE, which is located in the coverage area of the eNB or the qNB, of the information on the status of the NEF 720. The eNB or the gNB may notify the vehicle UE of the information on the status of the NEF 720, for example, through unicast or broadcast through a system information block type YYY.

When the vehicle UE located in the coverage area of the eNB or the qNB receives the information on the status of the NEF 720, the vehicle UE may store the information on the status of the NEF 720. The vehicle UE according to the embodiment may detect a V2X-NEF active status based on the stored information on the status of the NEF 720.

In this specification, the "V2X-NEF active status" may mean a status of using data acquired through communication with the NEF 720 in performing V2X communication between the vehicle UEs, but the meaning of the V2X-NEF active status is not limited thereto. For example, in some cases, the V2X-NEF active status may mean whether communication between V2X and the NEF 720 is in an active status. The V2X-NEF active status may be variously referred to as a V2X-NEF active mode, an NEF availability mode, a V2X-status exposure function (SEF), a vehicle SEF, etc., for example. In interpreting the terms throughout the specification, the terms should be interpreted not to be limited to the names and need to be interpreted by paying attention to various operations, capabilities and effects according to the meaning of the terms.

When the vehicle UE is out of the coverage area of the eNB or the gNB (for example, when a communication capable mode is deactivated or a limited service state is activated), the vehicle UE may delete information on the status of the NEF 720 or may not use the NEF 720 in performing V2X communication.

Figure 8:
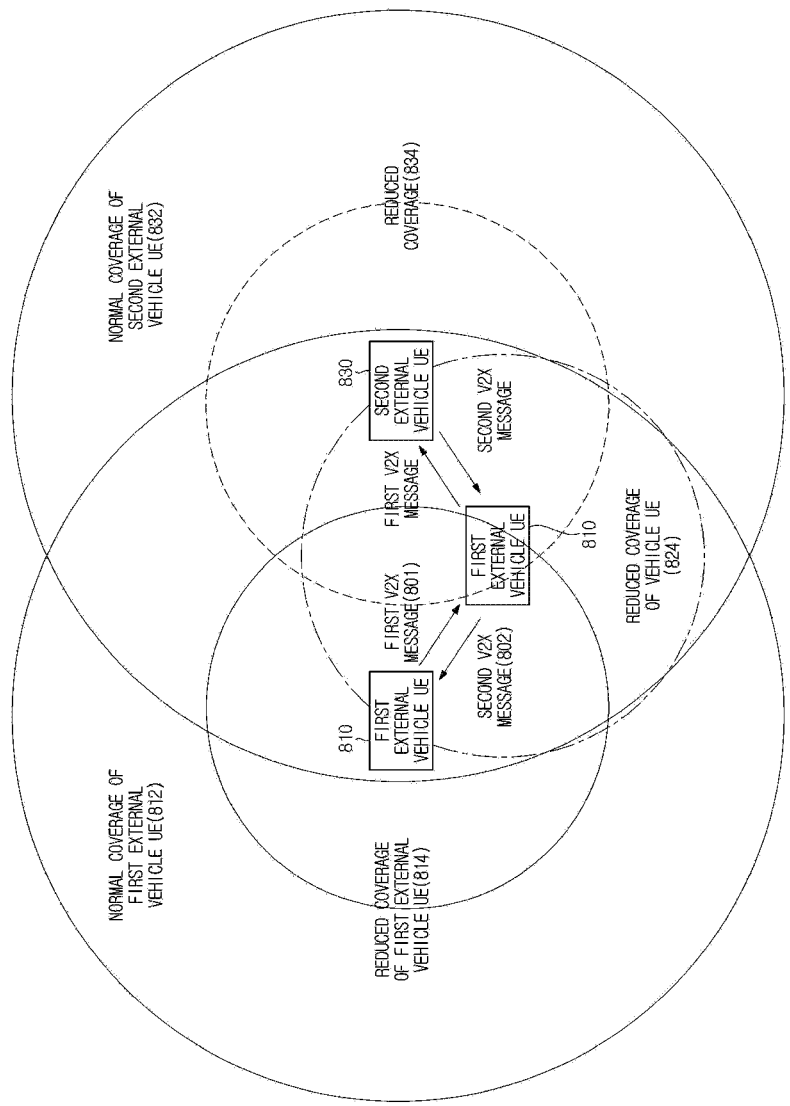
FIG. 8 is a view showing a coverage area of a vehicle UE, a first external vehicle UE and a second external vehicle UE according to an embodiment.

FIG. 8 is a view showing a coverage area of a vehicle UE, a first external vehicle UE and a second external vehicle UE according to an embodiment.

FIG. 8 shows normal coverage areas of a first external vehicle UE 810 and a second external vehicle UE 830, that is, normal coverages 812 and 832, and reduced coverages 814, 824 and 834 of the first external vehicle UE 810, a vehicle UE 820 and the second external vehicle UE 830.

When the coverage of the first external vehicle UE 810 is the normal coverage 812, the first external vehicle UE 810 may directly transmit a first V2X message 801 to the second external vehicle UE 830 located in the normal coverage 812 area. However, when the coverage of the first external vehicle UE 810 is the reduced coverage 814, the first external vehicle UE 810 may transmit the first V2X message 801 to the second external vehicle UE 830 through the vehicle UE 820 using a relaying method. At this time, the second external vehicle UE 830 is located in the reduced coverage 824 of the vehicle UE 820.

Similarly, the second external vehicle UE 830 may directly transmit a second V2X message 802 to the first external vehicle UE 810 when the coverage is the normal coverage 832, and may transmit the second V2X message 802 to the first external vehicle UE 810 through the vehicle UE 820 using a relaying method when the coverage is the reduced coverage 834. The first external vehicle UE 810 is located in the reduced coverage 824 of the vehicle UE 820.

Although the first external vehicle UE 810, the vehicle UE 820 and the second external vehicle UE 830 are shown as directly communicating with each other in FIG. 8, the first external vehicle UE 810, the vehicle UE 820 and the second external vehicle UE 830 according to the embodiment may communicate with each other through base stations (BSs) respectively communicating therewith.

When at least some of a plurality of vehicle UEs such as the first external vehicle UE 810, the vehicle UE 820 and the second external vehicle UE 830 perform communication using the NEF, it is necessary to adjust the range of the coverage area of each vehicle UE, in order to save energy and reduce an communication interference level. In addition, it is necessary to dynamically determine whether each vehicle UE applies a relaying method to V2X message transmission between vehicle UEs according to adjustment of the coverage area of each vehicle UE. Hereinafter, various embodiments of a vehicle UE for dynamically controlling a relaying method which is one of the V2X message transmission methods between vehicle UEs through a V2X service in a wireless communication system and a communication control method thereof will be described.

Figure 9:
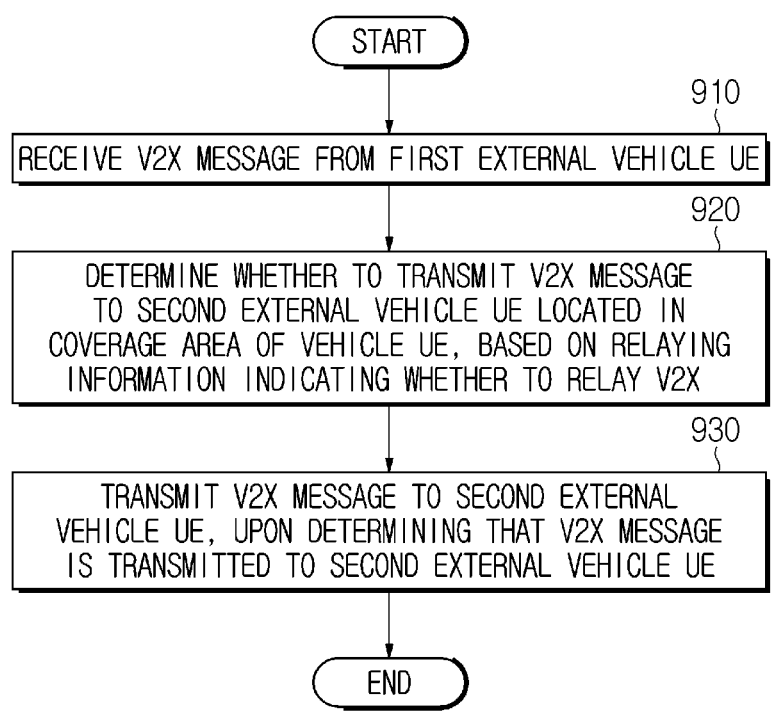
FIG. 9 is a flowchart illustrating a process of, at a vehicle UE according to an embodiment, controlling V2X message transmission between vehicle UEs through a V2X service.

FIG. 9 is a flowchart illustrating a process of, at a vehicle UE according to an embodiment, controlling V2X message transmission between vehicle UEs through a V2X service.

The vehicle UE according to the embodiment may transmit and receive signals to and from external vehicle UEs. The signals may include, for example, control information, data, etc. It will be easily understood by those skilled in the art that an object included in the term "vehicle UE" used throughout the present disclosure does not exclude a "UE other than the vehicle UE". That is, in the present disclosure, the "vehicle UE" may mean a "UE other than the vehicle UE".

In step 910, the vehicle UE may receive a V2X message from a first external vehicle UE.

The vehicle UE according to the embodiment may be located in the coverage area of the first external vehicle UE. More specifically, the vehicle UE may be located in the reduced area as compared to the normal coverage area of the first external vehicle UE. This is because, when the V2X message is transmitted between the vehicle UEs using a relaying method, the coverage area of the vehicle UE for transmitting the V2X message may be smaller than the normal coverage area.

The V2X message according to the embodiment may be referred to as V2X information. The V2X message may include, for example, a basic safety message (BSM) established in the DSRC J2735 standard of Society of Automotive Engineers (SAE), and an object included in the V2X message is not limited thereto.

The BSM may refer to a message broadcast from a predetermined vehicle in order to increase stability of a driving vehicle. In a vehicle-to-vehicle communication environment, each vehicle may broadcast the BSM to surrounding vehicles at a period of 100 msec. Each vehicle may receive the broadcast BSM to acquire information related to a safety service provided in each vehicle.

For example, the BSM may include a vehicle location, a movement direction, a current time and vehicle status information, and may further include additional information according to the type of the service. By designating msgID, msgCnt, id and secMark in order to represent the message ID of the BSM and the ID of the vehicle, 8 bytes may be allocated. By designating lat, long, elev and accuracy in order to represent the location of the vehicle, 14 bytes may be allocated. By designating speed, heading, angle and accelSet in order to represent the movement of the vehicle, 12 bytes may be allocated. By designating brakes in order to represent the brake information of the vehicle, 2 bytes may be allocated. By designating size in order to represent the size of the vehicle, 3 bytes may be allocated. That is, when the BSM is represented through the above example, a total of 39 bytes (312 bits) may be allocated.

In step 920, based on relaying information indicating whether the V2X message is relayed, whether the V2X message is transmitted to the second external vehicle UE located in the coverage area of the vehicle UE may be determined.

Relaying information according to the embodiment may include at least one of active status information, relay probability information or residual life or residual lifetime information. The residual life information of the relaying information may be acquired through the V2X message received from the first external vehicle UE, and the active status information and the relay probability information of the relaying information may be acquired through the eNB or the gNB communicating with the vehicle UE or by the vehicle UE itself. However, an embodiment of acquiring the relaying information is not limited to the above embodiment.

The value of the residual life included in the residual life information of the V2X message may be a non-negative integer and may be subtracted by a positive integer of 1 whenever passing through one vehicle UE in a relaying process. Therefore, the value of the residual life may indicate how many vehicle UEs the V2X message is relayed. In other words, the value of the residual life may indicate how many vehicle UEs the V2X message pass in an intermediate process in which the vehicle UE transmits the V2X message to a vehicle UE which is a final definition. However, the meaning of the value of the residual life is not limited thereto.

The vehicle UE according to the embodiment may determine whether the V2X message is transmitted to the second external vehicle UE located in the coverage area of the vehicle UE, based on the residual life information of the V2X message. The vehicle UE may determine that the V2X message is transmitted to the second external vehicle UE located in the coverage area of the vehicle UE, when the subtracted value of the residual life of the V2X message is a positive integer. In contrast, the vehicle UE may determine that the V2X message is not transmitted to the external vehicle UE, when the subtracted value of the residual life of the V2X message is 0.

In step 930, upon determining that the V2X message is transmitted to the second external vehicle UE, the vehicle UE may transmit the V2X message to the second external vehicle UE.

Figure 10:
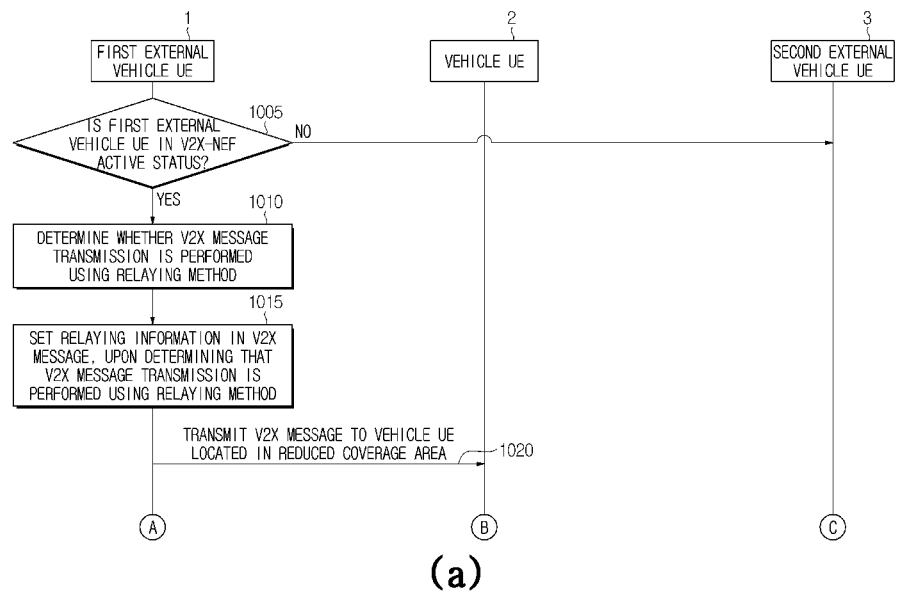
FIGS. 10(a) and 10(b) are flowcharts illustrating a process of transmitting and receiving a V2X message between vehicle UEs through a V2X service according to an embodiment.
Figure 10:
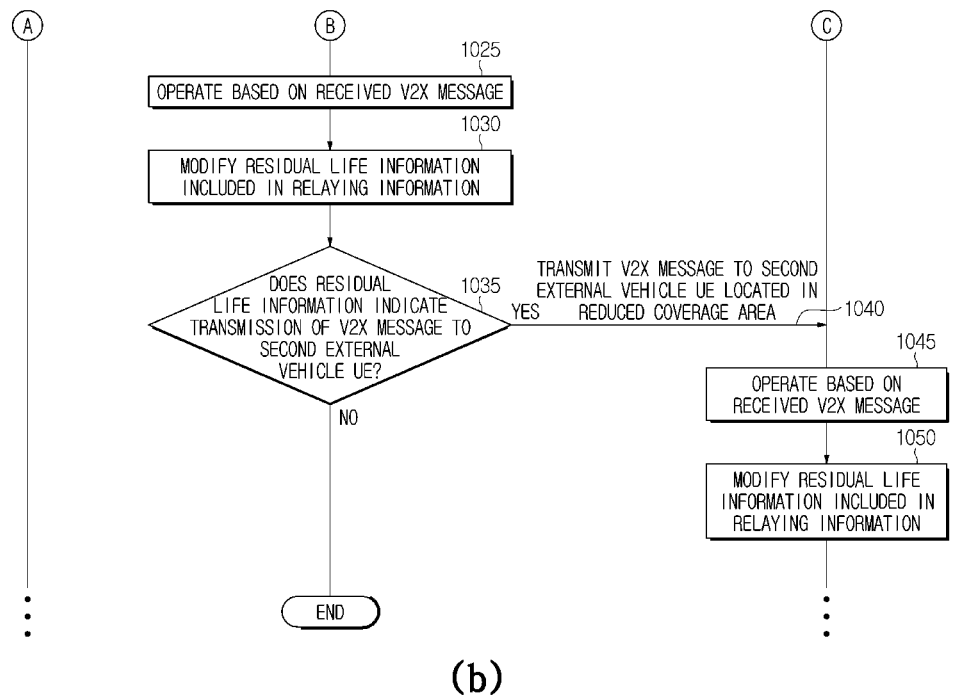

FIGS. 10(*a*) and 10(*b*) are flowcharts illustrating a process of transmitting and receiving a V2X message between vehicle UEs through a V2X service according to an embodiment.

In step 1005, the first external vehicle UE 1 may determine whether the first external vehicle UE 1 is in a V2X-network exposure function (NEF) active status.

For example, when the event receiving NF 710 of FIG. 7 is an eNB or a qNB communicating with the first external vehicle UE 1, the first external vehicle UE 1 may determine whether the first external vehicle UE 1 is in the V2X-NEF active status, based on the information on the status of the NEF 720 received from the AMF 730 by the eNB or the gNB.

Upon determining that the first external vehicle UE 1 is in a V2X-NEF inactive status, the first external vehicle UE 1 may transmit the V2X message to the second external vehicle UE 3 located in the normal coverage area of the first external vehicle UE 1. That is, when the first external vehicle UE 1 is in the V2X-NEF inactive status, the first external vehicle UE 1 may directly transmit the V2X message to the second external vehicle UE 3, instead of using the relaying method of transmitting the V2X message to the second external vehicle UE 3 through another external vehicle UE in order to transmit the V2X message to the second external vehicle UE 3.

Upon determining that the first external vehicle UE 1 is in the V2X-NEF active status, the first external vehicle UE 1 may determine whether V2X message transmission is performed using the relaying method in step 1010.

When the first external vehicle UE 1 transmits the V2X message to the vehicle UE 2 through the relaying method, the coverage area of the first external vehicle UE 1 is reduced as compared to the normal coverage area. At this time, the vehicle UE 2 should be located in the reduced coverage area of the first external vehicle UE 1 in order to receive the V2X message.

In step 1015, upon determining that V2X message transmission is performed using the relaying method, the first external vehicle UE 1 may set relaying information in the V2X message. For example, the first external vehicle UE 1 may set the value of the residual life of the V2X message to an arbitrary positive integer. When the first external vehicle UE 1 sets the value of the residual life of the V2X message to 3, V2X message may pass through three vehicle UEs in a process of being transmitted to the vehicle UE which is the final destination.

In step 1020, the first external vehicle UE 1 may transmit the V2X message to the vehicle UE 2 located in the reduced coverage area of the first external vehicle UE 1. The vehicle UE 2 may receive the V2X message from the first external vehicle UE 1.

In step 1025, the vehicle UE 2 may operate based on the received V2X message. For example, the vehicle UE 2 may recognize the location information, velocity information, brake information, vehicle size information of the first external vehicle UE 1 located around the vehicle UE 2, based on the BSM included in the received V2X message, and control the velocity, location, etc. of the vehicle UE 2 based on the recognized information.

In step 1030, the vehicle UE 2 may modify the residual life information included in the relaying information. For example, the vehicle UE 2 may subtract the value of the residual life by a positive integer of 1 in the relaying information included in the V2X message, in order to display that the received V2X message has passed through one vehicle UE in the relaying process.

In step 1035, the vehicle UE 2 may determine whether the residual life information modified in step 1030 indicates transmission of the V2X message to the second external vehicle UE 3.

For example, when the value of the residual life of the V2X message in the residual life information modified in step 1030 is a positive integer (That is, greater than 0), the vehicle UE 2 may determine that the modified residual life information indicates transmission of the V2X message to the second external vehicle UE 3 located in the coverage area of the vehicle UE 2.

In contrast, when the value of the residual life of the V2X message in the residual life information modified in step 1030 is 0, the vehicle UE 2 may determine that the modified residual life information does not indicate transmission of the V2X message to the second external vehicle UE 3.

Upon determining that the relaying information does not indicate transmission of the V2X message to the second external vehicle UE 3, the vehicle UE 2 may determine that the V2X message is not transmitted to the second external vehicle UE 3.

In contrast, upon determining that the relaying information indicates transmission of the V2X message to the second external vehicle UE 3, the vehicle UE 2 may determine that the V2X message is transmitted to the second external vehicle UE located in the reduced coverage area.

When the vehicle UE 2 transmits the V2X message received from the first external vehicle UE 1 to the second external vehicle UE 3, that is, transmits the V2X message to the second external vehicle UE 3 using the relaying method, the coverage area of the vehicle UE 2 is reduced as compared to the normal coverage area of the vehicle UE 2. In other words, the coverage area of the vehicle UE 2 when the V2X message is transmitted using the relaying method is smaller than the normal coverage area of the vehicle UE 2. At this time, the second external vehicle UE 3 should be located in the reduced coverage area of the vehicle UE 2, in order to receive the V2X message.

In step 1040, the vehicle UE 2 may transmit the V2X message to the second external vehicle UE 3 located in the reduced coverage area, based on the determination to transmit the V2X message to the second external vehicle UE 3. The second external vehicle UE 3 may receive the V2X message from the vehicle UE 2 in step 1040.

The second external vehicle UE 3 may operate based on the received V2X message in step 1045. For example, the second external vehicle UE 3 may update traffic status information or vehicle status information based on the received V2X message, and control autonomous driving of the second external vehicle UE 3 based on the traffic status information or the vehicle status information or communicate with an external base station or a UE. In addition, the second external vehicle UE 3 may perform additional relaying operation for the received V2X message. In this case, the second external vehicle UE 3 may modify the residual life information included in the relaying information included in the received V2X message in step 1050. It will be easily understood by those skilled in the art that operation of step 1045 by the second external vehicle UE 3 may correspond to operation of step 1025 by the vehicle UE 2, operation of step 1050 by the second external vehicle UE 3 may correspond to operation of step 1030 by the vehicle UE 2, and the second external vehicle UE 3 may perform operations corresponding to step 1035 and step 1040 after operation of step 1050.

Meanwhile, it will be easily understood by those skilled in the art that the V2X message acquired by the vehicle UE 2 in step 1020 and the V2X message acquired by the second external vehicle UE 3 in step 1045 are not equal to each other, because the residual life information is different.

Operations of steps 1025 to 1040 may be repeated until the relaying information indicates that the V2X message is not transmitted to the external vehicle UE.

Figure 11:
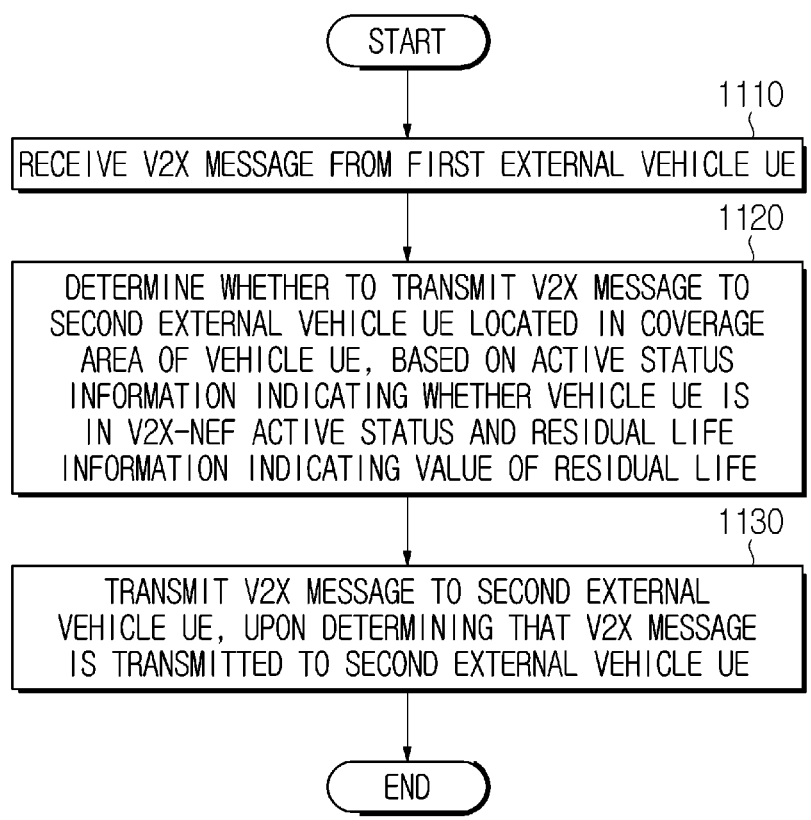
FIG. 11 is a flowchart illustrating a process of, at a vehicle UE according to another embodiment, controlling V2X message transmission between vehicle UEs through a V2X service.

FIG. 11 is a flowchart illustrating a process of, at a vehicle UE according to another embodiment, controlling V2X message transmission between vehicle UEs through a V2X service.

In FIG. 11, a description overlapping the description of FIGS. 9 and 10 will be omitted or simplified. More specifically, for example, since operations of the vehicle UE according to step 1110 and step 1130 respectively correspond to operations of the vehicle UE according to step 910 and step 930 of FIG. 9, a repeated description thereof will be omitted.

In step 1110, the vehicle UE may receive the V2X message from the first external vehicle UE.

In step 1120, the vehicle UE may determine whether the V2X message is transmitted to the second external vehicle UE located in the coverage area of the vehicle UE, based on the active status information indicating whether the vehicle UE is in the V2X-NEF active status and the residual life information indicating the value of the residual life. At this time, the relaying information indicating whether the V2X message is relayed may include active status information and residual life information.

For example, when the event receiving NF 710 of FIG. 7 is an eNB or a gNB communicating with the vehicle UE, the vehicle UE may determine whether the vehicle UE is in the V2X-NEF active status, based on information on the status of the NEF 720 received from the AMF 730 by the eNB or the gNB.

When the vehicle UE is in the V2X-NEF active status, the vehicle UE according to the embodiment may determine that it corresponds to a condition for transmitting the V2X message received from the first external vehicle UE to the second external vehicle UE and then analyze the residual life information of the V2X message.

When the vehicle UE is in the V2X-NEF inactive status, the vehicle UE according to the embodiment may determine that it does not correspond to the condition for transmitting the V2X message received from the first external vehicle UE to the second external vehicle UE. In other words, in this case, the vehicle UE does not relay the V2X message received from the first external vehicle UE to the second external vehicle UE.

When the vehicle UE is in the V2X-NEF inactive status, the vehicle UE according to the embodiment may generate a V2X message different from the V2X message received from the first external vehicle UE and transmit the generated V2X message to an external vehicle UE located in the normal coverage area.

The vehicle UE according to the embodiment may determine whether the V2X message is transmitted to the second external vehicle UE located in the coverage area of the vehicle UE, based on the residual life information included in the V2X message.

More specifically, after the value of the residual life included in the V2X message is subtracted by a positive integer of 1, if the subtracted value of the residual life is greater than 0, the vehicle UE may determine that the V2X message is transmitted to the second external vehicle UE located in the coverage area of the vehicle UE.

In the comprehensive review of step 1120, when the vehicle UE is in the V2X-NEF active status and the value of the reduced residual life is greater than 0, the vehicle UE according to the embodiment may determine that the V2X message is transmitted to the second external vehicle UE located in the coverage area of the vehicle UE.

In step 1130, upon determining that the V2X message is transmitted to the second external vehicle UE, the vehicle UE may transmit the V2X message to the second external vehicle UE.

Figure 12:
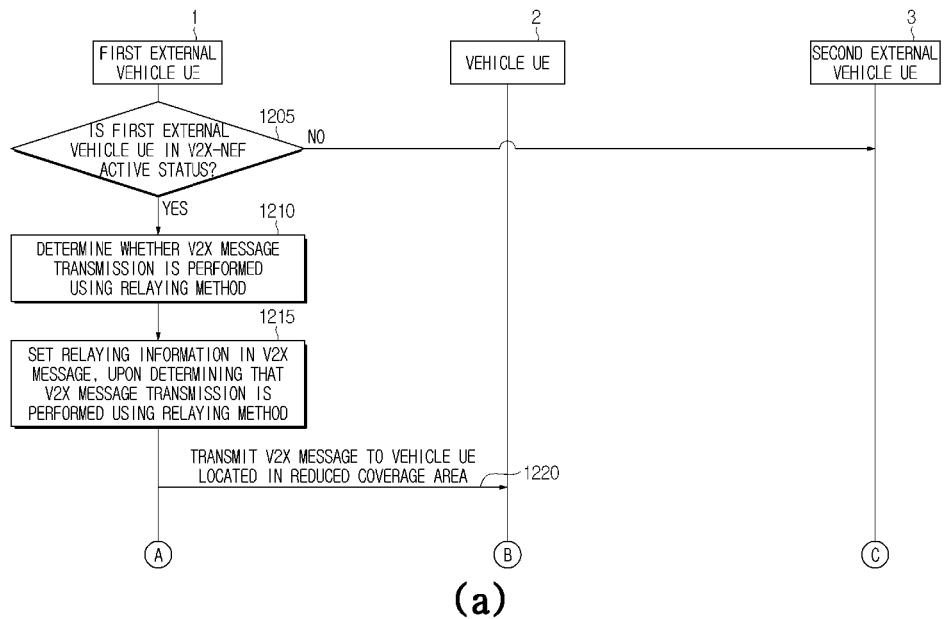
FIGS. 12(a) and 12(b) are flowcharts illustrating a process of transmitting and receiving a V2X message between vehicle UEs through a V2X service according to another embodiment.
Figure 12:
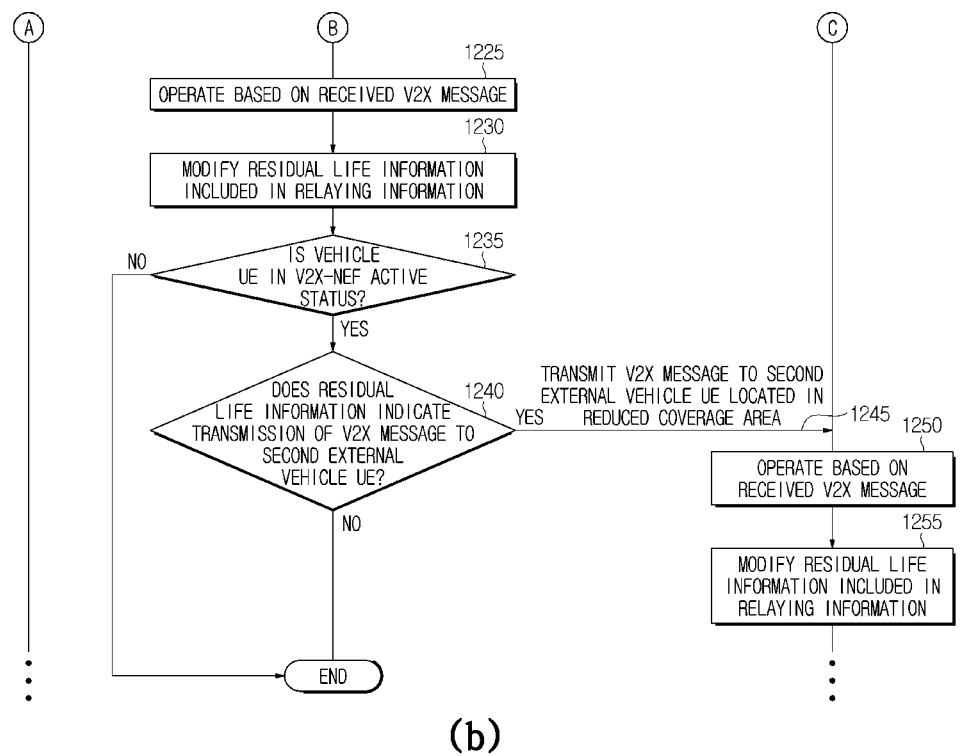

FIGS. 12(*a*) and 12(*b*) are flowcharts illustrating a process of transmitting and receiving a V2X message between vehicle UEs through a V2X service according to another embodiment.

In FIGS. 12(*a*) and 12(*b*), a description overlapping the description of FIGS. 9 to 11 will be omitted or simplified. More specifically, for example, since step 1205, step 1210, step 1215, step 1220, step 1225, step 1230, step 1240, step 1245, step 1250 and step 1255 of FIGS. 12(*a*) and 12(*b*) respectively correspond to operation of the vehicle UE according to step 1005, step 1010, step 1015, step 1020, step 1025, step 1030, step 1035, step 1045 and step 1050 of FIGS. 10A and 10B, a repeated description thereof will be omitted.

In step 1205, the first external vehicle UE 1 may determine whether the first external vehicle UE 1 is in the V2X-NEF active status.

Upon determining that the first external vehicle UE 1 is in the V2X-NEF inactive status, the first external vehicle UE 1 may transmit the V2X message to the second external vehicle UE 3 located in the normal coverage area of the first external vehicle UE 1.

Upon determining that the first external vehicle UE 1 is in the V2X-NEF active status, the first external vehicle UE 1 may determine whether V2X message transmission is performed using the relaying method in step 1210.

In step 1215, the first external vehicle UE 1 may set the relaying information in the V2X message, upon determining that V2X message transmission is performed using the relaying method.

In step 1220, the first external vehicle UE 1 may transmit the V2X message to the vehicle UE 2 located in the reduced coverage area of the first external vehicle UE 1. The vehicle UE 2 may receive the V2X message from the first external vehicle UE 1.

In step 1225, the vehicle UE 2 may operate based on the received V2X message.

In step 1230, the vehicle UE 2 may modify the residual life information included in the relaying information.

In step 1235, the vehicle UE 2 may determine whether the vehicle UE 2 is in the V2X-NEF active status.

Upon determining that the vehicle UE 2 is in the V2X-NEF active status, the vehicle UE 2 according to the embodiment may determine that it corresponds to a condition for transmitting the V2X message received from the first external vehicle UE 1 to the second external vehicle UE 3, and then perform operation of step 1240.

In contrast, upon determining that the vehicle UE 2 is in the V2X-NEF inactive status, the vehicle UE 2 may determine that it does not correspond to the condition for transmitting the V2X message received from the first external vehicle UE 1 to the second external vehicle UE 3.

In step 1240, the vehicle UE 2 may determine whether the residual life information modified in step 1230 indicates transmission of the V2X message to the second external vehicle UE 3.

Upon determining that the modified residual life information does not indicate transmission of the V2X message to the second external vehicle UE 3, the vehicle UE 2 according to the embodiment may determine that the V2X message is not transmitted to the second external vehicle UE 3.

In contrast, upon determining that the modified residual life information indicates transmission of the V2X message to the second external vehicle UE 3, the vehicle UE 2 may determine that the V2X message is transmitted to the second external vehicle UE 3 located in the reduced coverage area.

In step 1245, the vehicle UE 2 may transmit the V2X message to the second external vehicle UE 3 located in the reduced coverage area, based on the determination to transmit the V2X message to the second external vehicle UE 3. More specifically, upon determining that the vehicle UE 2 is in the V2X-NEF active status and the residual life information indicates transmission of the V2X message to the second external vehicle UE 3, the vehicle UE 2 may transmit the V2X message to the second external vehicle UE 3 located in the reduced coverage area. The second external vehicle UE 3 may receive the V2X message from the vehicle UE 2 in step 1245.

The second external vehicle UE 3 may operate based on the received V2X message in step 1250, and modify the residual life information included in the relaying information included in the received V2X message in step 1255. It is easily understood by those skilled in the art that operation of step 1250 by the second external vehicle UE 3 may correspond to operation of step 1225 by the vehicle UE 2, operation of step 1255 by the second external vehicle UE 3 may correspond to operation of step 1230 by the vehicle UE 2, and the second external vehicle UE 3 may perform operations corresponding to steps 1235 to step 1245 after operation of step 1255.

Operations of step 1225 to step 1245 may be repeated until the relaying information indicates that the V2X message is not transmitted to the external vehicle UE.

Figure 13:
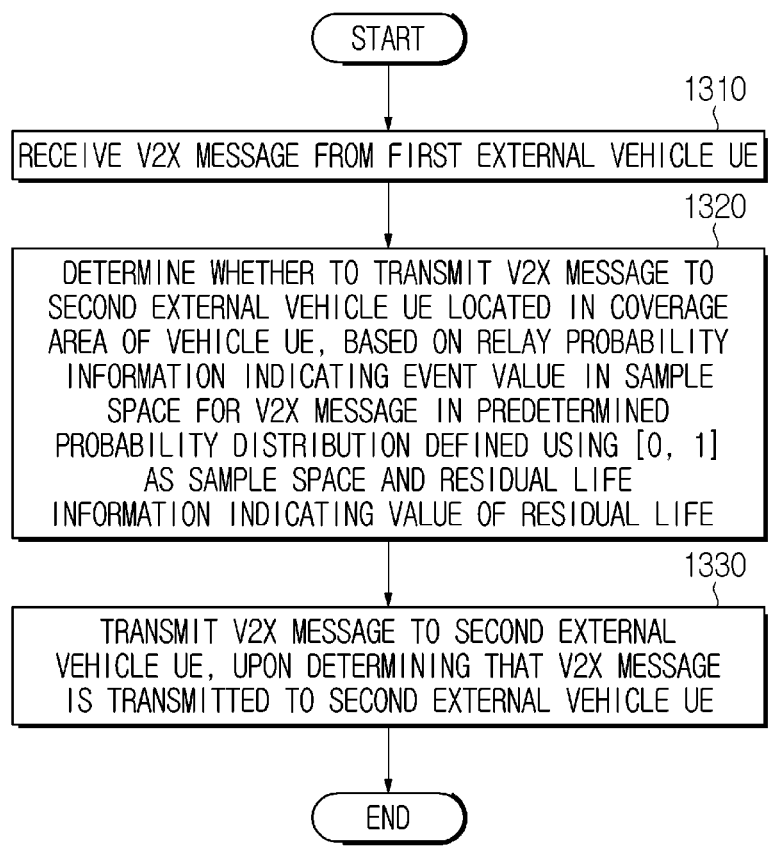
FIG. 13 is a flowchart illustrating a process of, at a vehicle UE according to another embodiment, controlling V2X message transmission between vehicle UEs through a V2X service.

FIG. 13 is a flowchart illustrating a process of, at a vehicle UE according to another embodiment, controlling V2X message transmission between vehicle UEs through a V2X service.

In FIG. 13, a description overlapping the description of FIGS. 9 and 12B will be omitted or simplified. More specifically, for example, since operations of the vehicle UE according to step 1310 and step 1330 respectively correspond to operations of the vehicle UE according to step 910 and step 930 of FIG. 9, a repeated description thereof will be omitted.

In step 1310, the vehicle UE may receive the V2X message from the first external vehicle UE.

In step 1320, the vehicle UE may determine whether the V2X message is transmitted to the second external vehicle UE located in the coverage area of the vehicle UE, based on relay probability information indicating an event value in a sample space for the V2X message in a predetermined probability distribution defined using [0, 1] as the sample space and the residual life information indicating the value of the residual life. At this time, the relaying information indicating whether the V2X message is relayed may include relay probability information and residual life information.

The vehicle UE according to the embodiment may determine whether it corresponds to a condition for transmitting the V2X message to the second external vehicle UE, based on whether the event value included in the relay probability information is equal to or greater than the predetermined threshold. The predetermined probability distribution may include, for example, at least one of a uniform distribution, a meta function distribution, an exponential function distribution or a log function distribution.

For example, when the predetermined threshold is 0.8, if the event value in the sample space for the V2X message in the uniform distribution defined using [0, 1] as the sample space is 0.9, the vehicle UE may determine that it corresponds to a condition for transmitting the V2X message to the second external vehicle UE.

In another example, when the predetermined threshold is 0.8, if the event value in the sample space for the V2X message in the uniform distribution defined using [0, 1] as the sample space is 0.7, the vehicle UE may determine that it does not correspond to a condition for transmitting the V2X message to the second external vehicle UE.

Through operation according to step 1320, for example, when the probability distribution is a uniform distribution, the vehicle UE may determine that it does not correspond to a condition for transmitting the V2X message to the second external vehicle UE with a probability corresponding to the predetermined threshold on average, and thus may not transmit the V2X message to the second external vehicle UE. In the case where operation according to step 1320 is performed, as compared to the case where operation according to step 1320 is not performed, it is possible to reduce unnecessary relay and to reduce congestion of the transport channel of the V2X service due to increase in unnecessary relaying traffic.

When the event in the sample space corresponding to the V2X message is equal to or greater than the predetermined threshold, the vehicle UE according to the embodiment may determine that it corresponds to a condition for transmitting the V2X message received from the first external vehicle UE to the second external vehicle UE, and then analyze the residual life information of the V2X message.

When the event in the sample space for the V2X message is less than the predetermined threshold, the vehicle UE according to the embodiment may determine that it does not correspond to the condition for transmitting the V2X message received from the first external vehicle UE to the second external vehicle UE. In other words, in this case, the vehicle UE does not relay the V2X message received from the first external vehicle UE to the second external vehicle UE.

When the event in the sample space for the V2X message is less than the predetermined threshold, the vehicle UE according to the embodiment may generate a V2X message different from the V2X message received from the first external vehicle UE and transmit the generated V2X message to an external vehicle UE located in the normal coverage area.

The vehicle UE according to the embodiment may determine whether the V2X message is transmitted to the second external vehicle UE located in the coverage area of the vehicle UE, based on the residual life information included in the V2X message.

In the comprehensive review of step 1320, when the event value in the sample space for the V2X message in the predetermined probability distribution defined using [0, 1] as the sample space is equal to or greater than the predetermined threshold and the value of the reduced residual life is greater than 0, the vehicle UE according to the embodiment may determine that the V2X message is transmitted to the second external vehicle UE located in the coverage area of the vehicle UE.

In step 1330, upon determining that the V2X message is transmitted to the second external vehicle UE, the vehicle UE may transmit the V2X message to the second external vehicle UE.

Figure 14:
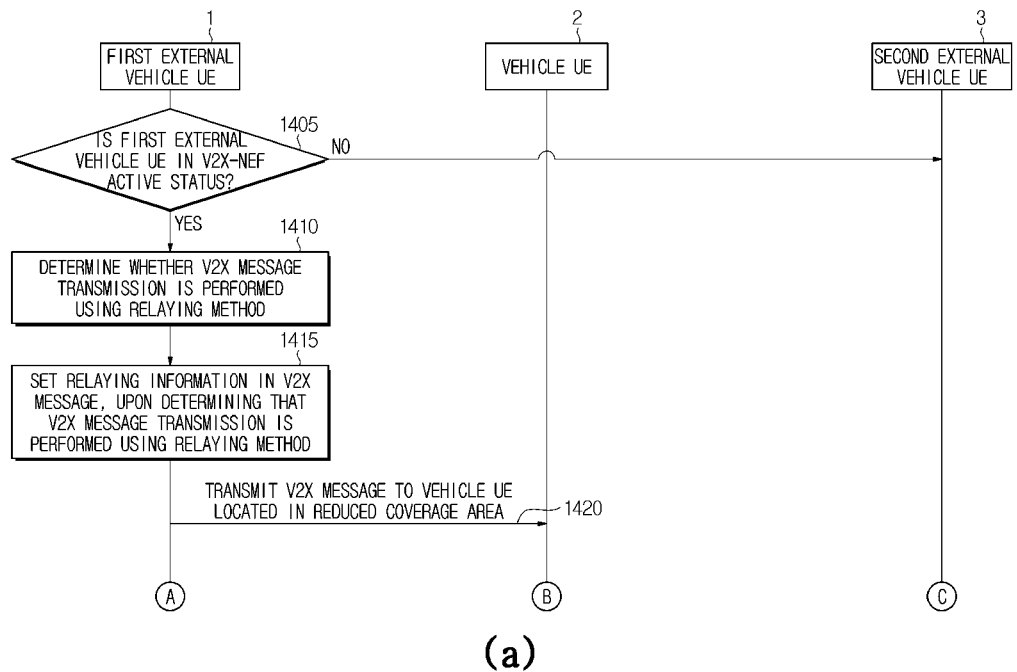
FIGS. 14(a) and 14(b) are flowcharts illustrating a process of transmitting and receiving a V2X message between vehicle UEs through a V2X service according to another embodiment.
Figure 14:
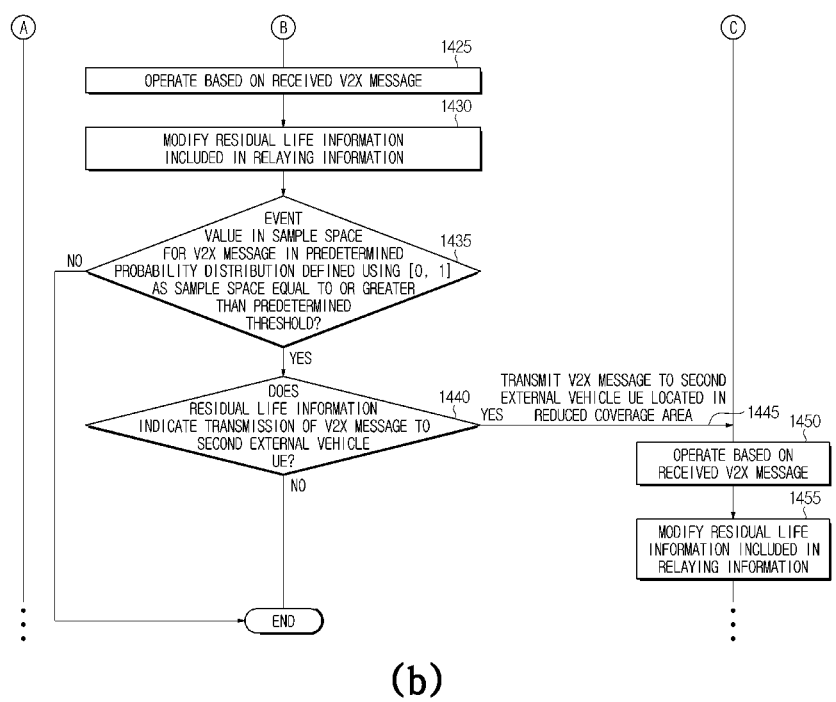

FIGS. 14(*a*) and 14(*b*) are flowcharts illustrating a process of transmitting and receiving a V2X message between vehicle UEs through a V2X service according to another embodiment.

In FIGS. 14(*a*) and 14(*b*), a description overlapping the description of FIGS. 9 to 13 will be omitted or simplified. More specifically, for example, since step 1405, step 1410, step 1415, step 1420, step 1425, step 1430, step 1440, step 1445, step 1450 and step 1455 of FIGS. 14(*a*) and 14(*b*) respectively correspond to operation of the vehicle UE according to step 1005, step 1010, step 1015, step 1020, step 1025, step 1030, step 1035, step 1045 and step 1050 of FIGS. 10A and 10B, a repeated description thereof will be omitted.

In step 1405, the first external vehicle UE 1 may determine whether the first external vehicle UE 1 is in the V2X-NEF active status.

Upon determining that the first external vehicle UE 1 is in the V2X-NEF inactive status, the first external vehicle UE 1 may transmit the V2X message to the second external vehicle UE 3 located in the normal coverage area of the first external vehicle UE 1.

Upon determining that the first external vehicle UE 1 is in the V2X-NEF active status, the first external vehicle UE 1 may determine whether V2X message transmission is performed using the relaying method in step 1410.

In step 1415, the first external vehicle UE 1 may set the relaying information in V2X message, upon determining that V2X message transmission is performed using the relaying method.

In step 1420, the first external vehicle UE 1 may transmit the V2X message to the vehicle UE 2 located in the reduced coverage area of the first external vehicle UE 1. The vehicle UE 2 may receive the V2X message from the first external vehicle UE 1.

In step 1425, the vehicle UE 2 may operate based on the received V2X message.

In step 1430, the vehicle UE 2 may modify the residual life information included in the received V2X message.

In step 1435, the vehicle UE 2 may determine whether the event value in the sample space for the V2X message in the predetermined probability distribution defined using [0, 1] as the sample space is equal to or greater than the predetermined threshold.

Upon determining that the event value in the sample space for the V2X message is equal to or greater than the predetermined threshold, the vehicle UE 2 according to the embodiment may determine that it corresponds to a condition for transmitting the V2X message received from the first external vehicle UE 1 to the second external vehicle UE 3, and then perform operation of step 1440.

In contrast, upon determining that the event value in the sample space for the V2X message is less than the predetermined threshold, the vehicle UE 2 may determine that it does not correspond to a condition for transmitting the V2X message received from the first external vehicle UE 1 to the second external vehicle UE 3.

In step 1440, the vehicle UE 2 may determine whether the residual life information modified in step 1430 indicates transmission of the V2X message to the second external vehicle UE 3.

Upon determining that the modified residual life information does not indicate transmission of the V2X message to the second external vehicle UE 3, the vehicle UE 2 according to the embodiment may determine that the V2X message is not transmitted to the second external vehicle UE 3. In contrast, upon determining that the modified residual life information indicates transmission of the V2X message to the second external vehicle UE 3, the vehicle UE 2 may determine that the V2X message is transmitted to the second external vehicle UE 3 located in the reduced coverage area.

In step 1445, the vehicle UE 2 may transmit the V2X message to the second external vehicle UE 3 located in the reduced coverage area, based on the determination to transmit the V2X message to the second external vehicle UE 3. More specifically, upon determining that the event value in the sample space for the V2X message in the predetermined probability distribution defined using [0, 1] as the sample space is equal to or greater than the predetermined threshold and the residual life information indicates transmission of the V2X message to the second external vehicle UE 3, the vehicle UE 2 may transmit the V2X message to the second external vehicle UE 3 located in the reduced coverage area. The second external vehicle UE 3 may receive the V2X message from the vehicle UE 2 in step 1445.

The second external vehicle UE 3 may operate based on the received V2X message in step 1450, and modify the residual life information included in the received V2X message in step 1455. It is easily understood by those skilled in the art that operation of step 1450 by the second external vehicle UE 3 may correspond to operation of step 1425 by the vehicle UE 2, operation of step 1455 by the second external vehicle UE 3 may correspond to operation of step 1430 by the vehicle UE 2, and the second external vehicle UE 3 may perform operations corresponding to step 1435 to step 1445 after step 1455.

Operations of step 1425 to step 1445 may be repeated until the relaying information indicates that the V2X message is not transmitted to the external vehicle UE.

Figure 15:
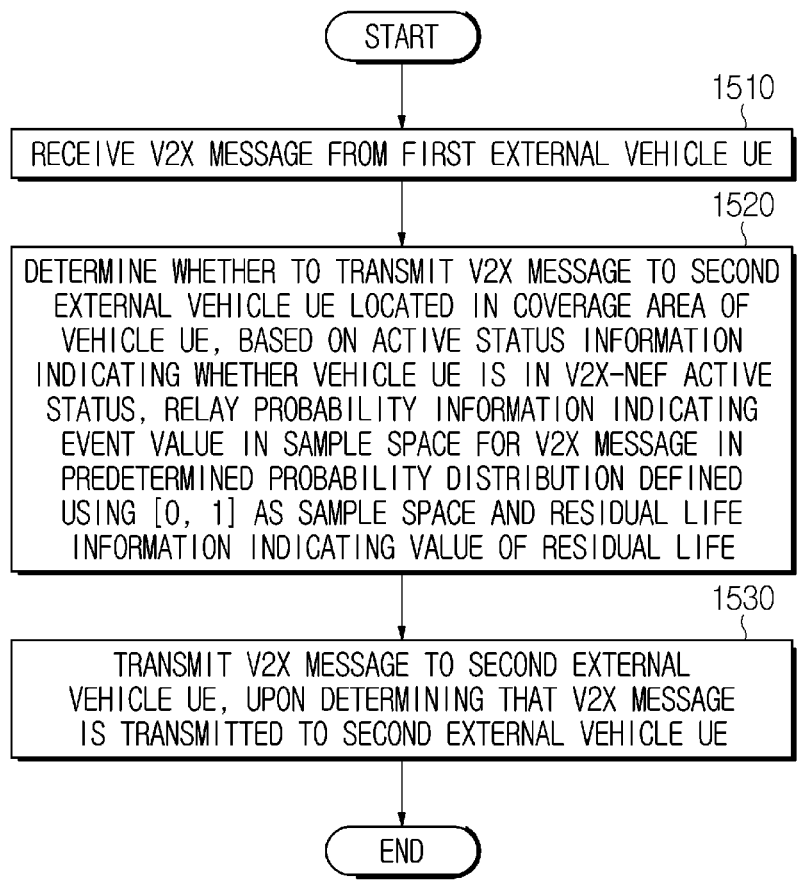
FIG. 15 is a flowchart illustrating a process of, at a vehicle UE according to another embodiment, controlling V2X message transmission between vehicle UEs through a V2X service according to another embodiment.

FIG. 15 is a flowchart illustrating a process of, at a vehicle UE according to another embodiment, controlling V2X message transmission between vehicle UEs through a V2X service.

In FIG. 15, a description overlapping the description of FIGS. 9 and 14B will be omitted or simplified. More specifically, for example, since operations of the vehicle UE according to step 1510 and step 1530 respectively correspond to operations of the vehicle UE according to step 910 and step 930 of FIG. 9, a repeated description thereof will be omitted.

In step 1510, the vehicle UE may receive the V2X message from the first external vehicle UE.

In step 1520, the vehicle UE may determine whether the V2X message is transmitted to the second external vehicle UE, based on the active status information indicating whether the vehicle UE is in the V2X-NEF active status, relay probability information indicating an event value in a sample space for the V2X message in a predetermined probability distribution defined using [0, 1] as the sample space and the residual life information indicating the value of the residual life. At this time, the relaying information indicating whether the V2X message is relayed may include active status information, relay probability information and residual life information.

When the vehicle UE is in the V2X-NEF active status, the vehicle UE according to the embodiment may determine that it corresponds to a condition for transmitting the V2X message received from the first external vehicle UE to the second external vehicle UE, and then analyze relay probability distribution included in the relaying information.

When the vehicle UE is in the V2X-NEF inactive status, the vehicle UE according to the embodiment may determine that it does not correspond to a condition for transmitting the V2X message received from the first external vehicle UE to the second external vehicle UE. In other words, in this case, the vehicle UE does not relay the V2X message received from the first external vehicle UE to the second external vehicle UE.

When the vehicle UE is in the V2X-NEF inactive status, the vehicle UE according to the embodiment may generate a V2X message different from the V2X message received from the first external vehicle UE and transmit the generated V2X message to an external vehicle UE located in the normal coverage area.

The vehicle UE according to the embodiment may determine whether it corresponds to a condition for transmitting the V2X message to the second external vehicle UE, based on whether the event value in the sample space for the V2X message in the predetermined probability distribution defined using [0, 1] as the sample space is equal to or greater than the predetermined threshold.

Upon determining that the event value in the sample space for the V2X message is equal to or greater than the predetermined threshold, the vehicle UE according to the embodiment may determine that it corresponds to a condition for transmitting the V2X message received from the first external vehicle UE to the second external vehicle UE, and then analyze the residual life information of the V2X message.

Upon determining that the event value in the sample space for the V2X message is less than the predetermined threshold, the vehicle UE according to the embodiment may determine that it does not correspond to a condition for transmitting the V2X message received from the first external vehicle UE to the second external vehicle UE. In other words, the vehicle UE does not relay the V2X message received from the first external vehicle UE to the second external vehicle UE.

Upon determining that the event value in the sample space for the V2X message is less than the predetermined threshold, the vehicle UE according to the embodiment may generate a V2X message different from the V2X message received from the first external vehicle UE and transmit the generated V2X message to an external vehicle UE located in the normal coverage area.

The vehicle UE according to the embodiment may determine whether the V2X message is transmitted to the second external vehicle UE located in the coverage area of the vehicle UE, based on the residual life information included in the V2X message.

In the comprehensive review of step 1520, when the vehicle UE is in the V2X-NEF active status, the event value in the sample space for the V2X message in the predetermined probability distribution defined using [0, 1] as the sample space is equal to or greater than the predetermined threshold and the value of the reduced residual life is greater than 0, the vehicle UE according to the embodiment may determine that the V2X message is transmitted to the second external vehicle UE located in the coverage area of the vehicle UE.

In step 1530, upon determining that the V2X message is transmitted to the second external vehicle UE, the vehicle UE may transmit the V2X message to the second external vehicle UE.

Figure 16:
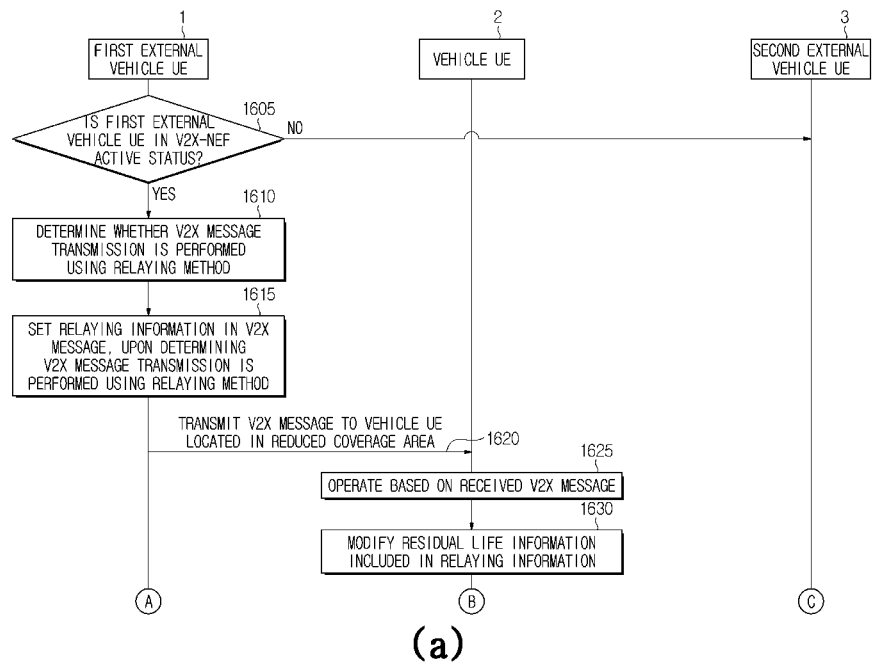
FIGS. 16(a) and 16(b) are flowcharts illustrating a process of transmitting and receiving a V2X message between vehicle UEs through a V2X service according to another embodiment.
Figure 16:
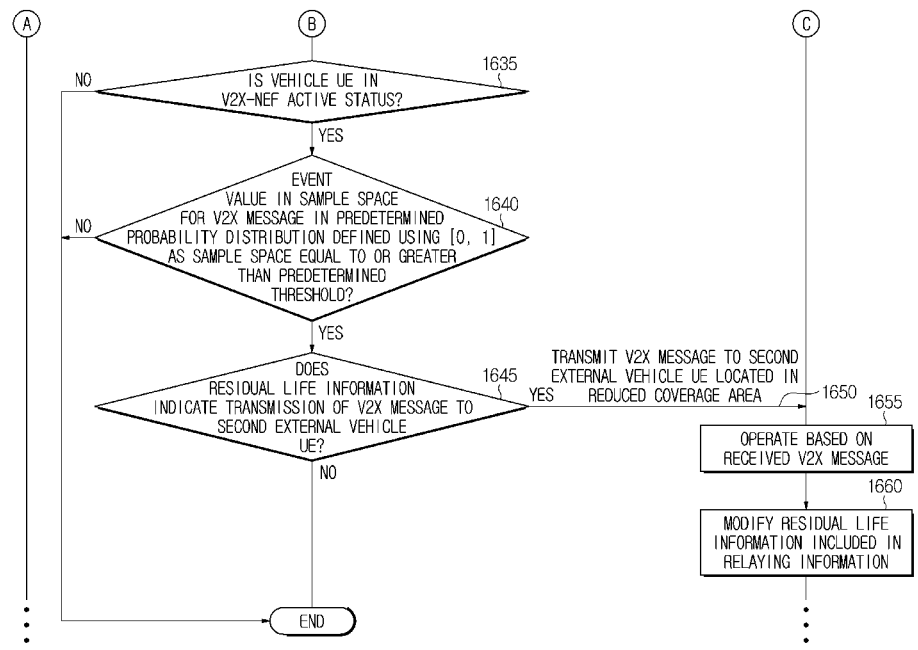

FIGS. 16(*a*) and 16(*b*) are flowcharts illustrating a process of transmitting and receiving a V2X message between vehicle UEs through a V2X service according to another embodiment.

In FIG. 16, a description overlapping the description of FIGS. 9 to 15 will be omitted or simplified. More specifically, for example, since step 1605, step 1610, step 1615, step 1620, step 1625, step 1630, step 1645, step 1650, step 1655 and step 1660 of FIGS. 16(*a*) and 16(*b*) respectively correspond to operation of the vehicle UE according to step 1005, step 1010, step 1015, step 1020, step 1025, step 1030, step 1035, step 1045 and step 1050 of FIGS. 10A and 10B, a repeated description thereof will be omitted.

In step 1605, the first external vehicle UE 1 may determine whether the first external vehicle UE 1 is in the V2X-NEF active status.

Upon determining that the first external vehicle UE 1 is in the V2X-NEF inactive status, the first external vehicle UE 1 may transmit the V2X message to the second external vehicle UE 3 located in the normal coverage area of the first external vehicle UE 1.

Upon determining that the first external vehicle UE 1 is in the V2X-NEF active status, the first external vehicle UE 1 may determine whether V2X message transmission is performed using the relaying method in step 1610.

In step 1615, the first external vehicle UE 1 may set the relaying information in the V2X message, upon determining that V2X message transmission is performed using the relaying method.

In step 1620, the first external vehicle UE 1 may transmit the V2X message to the vehicle UE 2 located in the reduced coverage area of the first external vehicle UE 1. The vehicle UE 2 may receive the V2X message from the first external vehicle UE 1.

In step 1625, the vehicle UE 2 may operate based on the received V2X message.

In step 1630, the vehicle UE 2 may modify the residual life information included in the received V2X message.

In step 1635, the vehicle UE 2 may determine whether the vehicle UE 2 is in the V2X-NEF active status.

Upon determining that the vehicle UE 2 is in the V2X-NEF active status, the vehicle UE 2 according to the embodiment may determine that it corresponds to a condition for transmitting the V2X message received from the first external vehicle UE 1 to the second external vehicle UE 3, and then perform operation of step 1640.

Upon determining that the vehicle UE 2 is in the V2X-NEF inactive status, the vehicle UE 2 may determine that it does not correspond to the condition for transmitting the V2X message received from the first external vehicle UE 1 to the second external vehicle UE 3.

In step 1640, the vehicle UE may determine whether the event value in the sample space for the V2X message in the predetermined probability distribution defined using [0, 1] as the sample space is equal to or greater than the predetermined threshold.

Upon determining that the event value in the sample space for the V2X message is equal to or greater than the predetermined threshold, the vehicle UE 2 according to the embodiment may determine that it corresponds to a condition for transmitting the V2X message received from the first external vehicle UE 1 to the second external vehicle UE 3, and then perform operation of step 1645.

In contrast, upon determining that the event value in the sample space for the V2X message is less than the predetermined threshold, the vehicle UE 2 may determine that it does not correspond to a condition for transmitting the V2X message received from the first external vehicle UE 1 to the second external vehicle UE 3.

In step 1645, the vehicle UE 2 may determine whether the residual life information modified in step 1630 indicates transmission of the V2X message to the second external vehicle UE 3.

Upon determining that the modified residual life information does not indicate transmission of the V2X message to the second external vehicle UE 3, the vehicle UE 2 according to the embodiment may determine that the V2X message is not transmitted to the second external vehicle UE 3. In contrast, upon determining that the modified residual life information indicates transmission of the V2X message to the second external vehicle UE 3, the vehicle UE 2 may determine that the V2X message is transmitted to the second external vehicle UE 3 located in the reduced coverage area.

In step 1650, the vehicle UE 2 may transmit the V2X message to the second external vehicle UE 3 located in the reduced coverage area, based on the determination to transmit the V2X message to the second external vehicle UE 3. More specifically, upon determining that the vehicle UE 2 is in the V2X-NEF active status, the event value in the sample space for the V2X message in the predetermined probability distribution defined using [0, 1] as the sample space is equal to or greater than the predetermined threshold and the modified residual life information indicates transmission of the V2X message to the second external vehicle UE 3, the vehicle UE 2 may transmit the V2X message to the second external vehicle UE 3 located in the reduced coverage area. The second external vehicle UE 3 may receive the V2X message from the vehicle UE 2 in step 1650.

The second external vehicle UE 3 may operate based on the received V2X message in step 1655, and modify the residual life information included in the received V2X message in step 1660. It is easily understood by those skilled in the art that operation of step 1655 by the second external vehicle UE 3 may correspond to operation of step 1625 by the vehicle UE 2, operation of step 1660 by the second external vehicle UE 3 may correspond to operation of step 1630 by the vehicle UE 2, and the second external vehicle UE 3 may perform operations corresponding to step 1635 to step 1650 after step 1660.

Operations of step 1625 to step 1650 may be repeated until the relaying information indicates that the V2X message is not transmitted to the external vehicle UE.

In the flowcharts shown in FIGS. 9 to 16, some steps may be performed regardless of the order of steps described herein. For example, operation according to step 1530 of FIG. 15 may be performed before operation according to step 1520 and operation according to step 1640 of FIG. 16B may be performed before operation according to step 1635.

Figure 17:
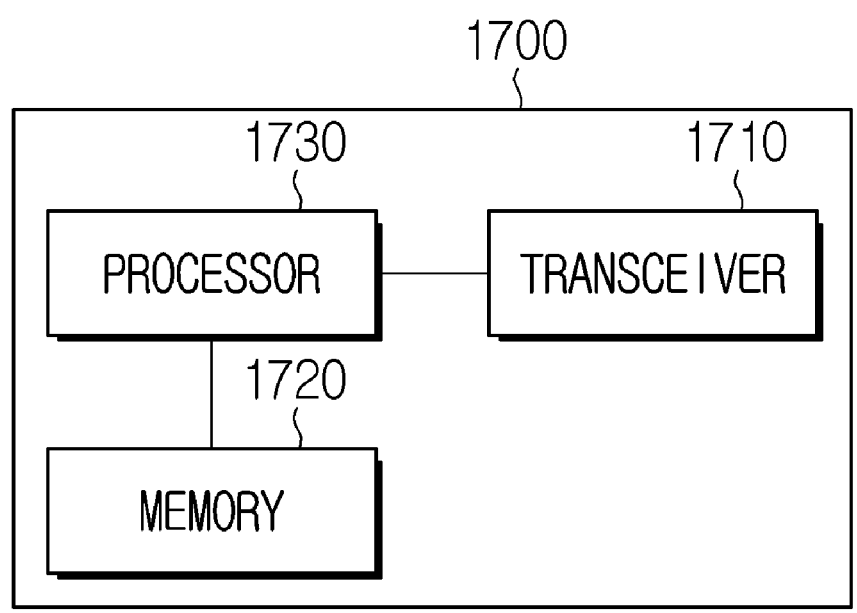
FIG. 17 is a block diagram showing the configuration of a vehicle UE according to an embodiment.

FIG. 17 is a block diagram showing the configuration of a vehicle UE according to an embodiment.

The components of the vehicle UE 1700 shown in FIG. 17 may perform operations of the vehicle UEs described in FIGS. 6 to 16B, such as the vehicle UE 2, the first external vehicle UE 1 and the second external vehicle UE 3, and a description overlapping the description of FIGS. 6 to 16B will be omitted or simplified.

As shown in FIG. 17, the vehicle UE 1700 according to the embodiment may include a transceiver 1710, a memory 1720 and a processor 1730. However, all the components shown in FIG. 17 are not essential components of the vehicle UE 1700. The vehicle UE 1700 may be implemented by more or less components than those shown in FIG. 17.

In the vehicle UE 1700 according to the embodiment, the transceiver 1710, the memory 1720 and the processor 1730 may be implemented as separate chips or at least two of the components may be implemented through a single chip.

The transceiver 1710 according to the embodiment may transmit and receive signals to and from a base station. The transceiver 1710 may transmit and receive signals to and from external vehicle UEs through the base station. At this time, the signals may include control information or data. The transceiver 1710 may include one or more antennas for transmitting and/or receiving radio signals.

The memory 1720 according to the embodiment may store at least one program for processing and control of the processor 1730, and store signals input to the vehicle UE 1700 or signals output from the vehicle UE 1700.

The processor 1730 according to the embodiment may control overall operation of the vehicle UE 1700. For example, the processor 1630 may perform functions or operations of the vehicle UE described in FIGS. 6 to 16. In addition, the processor 1730 may control the components included in the vehicle UE 1700, such as the transceiver 1710, the memory 1720, etc.

The processor 1730 according to the embodiment may be implemented as one processor or may be implemented as two or more processors in some cases.

The processor 1730 according to the embodiment may control the transceiver 1710 to receive the V2X message from the first external vehicle UE.

The processor 1730 according to the embodiment may determine whether the V2X message is transmitted to the second external vehicle UE located in the coverage area of the vehicle UE, based on the relaying information indicating whether the V2X message is relayed.

The processor 1730 according to the embodiment may transmit the V2X message to the second external vehicle UE, upon determining that the V2X message is transmitted to the second external vehicle UE.

The processor 1730 according to the embodiment may determine whether it corresponds to a condition for transmitting the V2X message to the second external vehicle UE, based on the V2X-NEF active status of the vehicle UE.

The processor 1730 according to the embodiment may transmit the V2X message to the second external vehicle UE, when the vehicle UE is in the V2X-NEF active status and the residual life information indicates that the V2X message is transmitted to the second external vehicle UE.

The processor 1730 according to the embodiment may determine whether it corresponds to a condition for transmitting the V2X message to the second external vehicle UE, based on whether the event value in the sample space for the V2X message in the predetermined probability distribution defined using [0, 1] as the sample space is equal to or greater than the predetermined threshold.

The processor 1730 according to the embodiment may transmit the V2X message to the second external vehicle UE, when the event value in the sample space for the V2X message in the predetermined probability distribution defined using [0, 1] as the sample space is equal to or greater than the predetermined threshold and the residual life information indicates transmission of the V2X message to the second external vehicle UE.

The processor 1730 according to the embodiment may transmit the V2X message to the second external vehicle UE, when the event value in the sample space for the V2X message in the predetermined probability distribution defined using [0, 1] as the sample space is equal to or greater than the predetermined threshold, the vehicle UE is in the V2X-NEF active status and the residual life information indicates transmission of the V2X message to the second external vehicle UE.

In one embodiment, the relaying information may include at least one of active status information, relay probability information or residual life information.

The processor 1730 according to the embodiment may operate by executing at least one program stored in the memory 1720.

In one embodiment, the vehicle UE 1700 may communicate with at least one of a mobile terminal, a network, or an autonomous vehicle other than the vehicle UE 1700.

In one embodiment, the vehicle UE 1700 may implement at least one advanced driver assistance system (ADAS) function based on a signal for controlling movement of the vehicle UE 1700.

In one embodiment, the vehicle UE 1700 may receive user input and switch the driving mode of the vehicle UE from an autonomous driving mode to a manual driving mode or from the manual driving mode to the autonomous driving mode.

In one embodiment, the vehicle UE 1700 is autonomously driven based on external object information, and the external object information may include at least one of information on presence/absence of an object, location information of the object, information on a distance between the vehicle UE 1700 and the object or information on a relative velocity between the vehicle UE 1700 and the object.

In one embodiment, the vehicle UE 1700 may be a base station, a network node, a transmission UE, a reception UE, a wireless device, a wireless communication device, a vehicle, a vehicle having an autonomous driving function, a connected car, a drone (unmanned aerial vehicle (UAV), an artificial intelligence (AI) module, a robot, an augmented reality (AR) device, a virtual reality (VR) device, a mixed reality (MR) device, a hologram device, a public safety device, an MTC device, an IoT device, a medical device, a fintech device (or a financial device), a security device, a climate/environment device, a device related to a 5G service or a device related to the fourth industrial revolution.

For example, the (vehicle) UE may include a mobile phone, a smartphone, a laptop computer, a digital broadcast terminal, a personal digital assistant (PDA), a portable multimedia player (PMP), a navigation system, a slate PC, a table PC, an ultrabook, a wearable device (e.g., a watch type terminal (smartwatch), a glass type terminal (smart glasses) or a head mounted display (HMD)), etc. For example, the HMD may be a display device worn on a head. For example, the HMD may be used to implement VR, AR or MR.

For example, a drone may be an unmanned aerial vehicle flying by a radio control signal. For example, the VR device may include a device for implementing an object or background of a virtual world. For example, the AR device may include a device implemented by connecting an object or background of a virtual world to an object or background of a real world. For example, the MR device may include a device implemented by combining an object or background of a virtual world to an object or background of a real world. For example, the hologram device may include a device for implementing 360-degree stereoscopic image by recording and reproducing stereoscopic information using an interference phenomenon of light generated by enabling two laser lights called holography to meet. For example, the public safety device may include an image relay device or an image device wearable on a user's body. For example, the MTC device and the IoT device may not require direct human intervention or manipulation. For example, the MTC device and the IoT device may include a smart meter, a vending machine, a thermometer, a smart light bulb, a door lock or various sensors. For example, the medical device may be used to diagnose, heal, alleviate, treat or prevent diseases. For example, the medical device may be used to diagnose, alleviate or correct injuries or disorders. For example, the medical device may be used to examine, replace or modify a structure or a function. For example, the medical device may be used to control pregnancy. For example, the medical device may include a diagnosis device, a surgery device, an in-vitro diagnosis device, a hearing aid, or a treatment device. For example, the security device may be installed to prevent a risk which may occur and to maintain safety. For example, the security device may be a camera, a CCTV, a recorder or a block box. For example, the fintech device may provide financial services such as mobile payment. For example, the fintech device may include a payment device or a point of sales (POS). For example, the climate/environment device may include a device for monitoring or predicting a climate/environment.

The above description of the disclosure is for illustrative purposes only, and those of ordinary skill in the technical field to which the disclosure belongs will be able to understand that modifications to other specific forms are possible without changing the technical idea or essential features of the disclosure. Therefore, it should be understood that the embodiments described above are illustrative in all respects and not limiting. For example, each component described in a single manner may be implemented in a distributed manner, and similarly, components described as being distributed may also be implemented in a combined form. The scope of the disclosure may be indicated by the claims to be described later, and all changes or modified forms derived from the meaning and scope of the claims and the concept of equivalents thereof may be interpreted as being included in the scope of the present disclosure.

The invention claimed is:

1. A communication control method of a vehicle user equipment (UE) for controlling vehicle-to-everything (V2X) message transmission between vehicle UEs through a V2X service in a wireless communication system, the communication control method comprising:
  receiving a V2X message from a first vehicle UE based on the vehicle UE being located in a coverage area of the first vehicle UE, wherein the first vehicle UE is in a V2X-network exposure function (NEF) active status;
  determining whether the V2X message is transmitted to a second vehicle UE located in a coverage area of the vehicle UE, based on relaying information indicating whether the V2X message is relayed; and
  transmitting the V2X message to the second vehicle UE, upon determining that the V2X message is transmitted to the second vehicle UE,
  wherein the relaying information includes at least one of active status information, relay probability information or residual life information.

2. The communication control method of claim 1, wherein, when the V2X message is received from the first vehicle UE, the coverage area of the vehicle UE is smaller than a normal coverage area of the vehicle UE.

3. The communication control method of claim 1, wherein the relaying information includes the residual life information, and the residual life information is acquired from the received V2X message, wherein the determining of whether the V2X message is transmitted further comprises subtracting, by a positive integer of 1, a value of a residual life indicated by the residual life information, and wherein, when the reduced value of the residual life is greater than 0, the V2X message including the reduced value of the residual life is transmitted to the second vehicle UE.

4. The communication control method of claim 3, wherein, when the reduced value of the residual life is not greater than 0, the V2X message is not transmitted to the second vehicle UE.

5. The communication control method of claim 1,
wherein the relaying information includes the active status information,
wherein the active status information indicates whether the vehicle UE is in the V2X-NEF active status, and
wherein whether the V2X message is transmitted to the second vehicle UE is determined based on whether the vehicle UE is in the V2X-NEF active status.

6. The communication control method of claim 5,
wherein the relaying information includes the residual life information,
wherein the residual life information is acquired from the received V2X message,
wherein the determining of whether the V2X message is transmitted further comprises subtracting, by a positive integer of 1, a value of a residual life indicated by the residual life information, and
wherein, when the vehicle UE is in the V2X-NEF active status and the reduced value of the residual life is greater than 0, the V2X message including the reduced value of the residual life is transmitted to the second vehicle UE.

7. The communication control method of claim 1,
wherein the relaying information includes the relay probability information,
wherein the relay probability information indicates an event value in a sample space for the V2X message in a predetermined probability distribution defined using [0, 1] as the sample space, and
wherein whether the V2X message is transmitted to the second vehicle UE is determined based on whether the event value is equal to or greater than a predetermined threshold.

8. The communication control method of claim 5,
wherein the relaying information includes the relay probability information,
wherein the relay probability information indicates an event value in a sample space for the V2X message in a predetermined probability distribution defined using [0, 1] as the sample space, and
wherein whether the V2X message is transmitted to the second vehicle UE is determined based on whether the event value is equal to or greater than a predetermined threshold.

9. The communication control method of claim 7, wherein the predetermined probability distribution includes at least one of a uniform distribution, a meta function distribution, an exponential function distribution or a log function distribution.

10. The communication control method of claim 7,
wherein the relaying information includes the residual life information,
wherein the residual life information is acquired from the received V2X message,
wherein the determining of whether the V2X message is transmitted further comprises subtracting, by a positive integer of 1, a value of a residual life indicated by the residual life information, and
wherein, when the event value is equal to or greater than the predetermined threshold and the reduced value of the residual life is greater than 0, the V2X message is transmitted to the second vehicle UE.

11. The communication control method of claim 8, wherein, when the vehicle UE is in the V2X-NEF active status, the event value is equal to or greater than the predetermined threshold, and the reduced value of the residual life is greater than 0, the V2X message is transmitted to the second vehicle UE.

12. The communication control method of claim 1, wherein the V2X message include a basic safety message (BSM).

13. A vehicle user equipment (UE) for controlling vehicle-to-everything (V2X) message transmission between vehicle UEs through a V2X service in a wireless communication system, the vehicle UE comprising:
a transceiver configured to transmit and receive signals to and from vehicle UEs; and
at least one processor,
wherein the at least one processor:
controls the transceiver to receive a V2X message from a first vehicle UE based on the vehicle UE being located in a coverage area of the first vehicle UE, wherein the first vehicle UE is in a V2X-network exposure function (NEF) active status;
determines whether the V2X message is transmitted to a second vehicle UE located in a coverage area of the vehicle UE, based on relaying information indicating whether the V2X message is relayed; and
controls the transceiver to transmit the V2X message to the second vehicle UE, upon determining that the V2X message is transmitted to the second vehicle UE, and
wherein the relaying information includes at least one of active status information, relay probability information or residual life information.

14. The vehicle UE of claim 13, wherein the vehicle UE communicates with at least one of a mobile terminal, a network or an autonomous vehicle other than the vehicle UE.

15. The vehicle UE of claim 13, wherein the vehicle UE implements at least one advanced driver assistance system (ADAS) based on a signal for controlling movement of the vehicle UE.

16. The vehicle UE of claim 13, wherein the vehicle UE receives user input and switches a driving mode of the vehicle UE from an autonomous driving mode to a manual driving mode or from the manual driving mode to the autonomous driving mode.

17. The vehicle UE of claim 13, wherein the vehicle UE is autonomously driven based on object information, and the object information includes at least one of information on presence/absence of an object, location information of the object, information on a distance between the vehicle UE and the object or information on a relative velocity between the vehicle UE and the object.

18. A wireless communication system for dynamic relaying control of vehicle-to-everything (V2X) message transmission between vehicle UEs through a V2X service, the wireless communication system comprising:
a first vehicle UE including a first transceiver configured to transmit and receive signals to vehicle UEs, and a first processor configured to control the first transceiver to transmit a V2X message to a second vehicle UE based on the first vehicle UE being located in a coverage area of the second vehicle UE, wherein the second vehicle UE is in a V2X-network exposure function (NEF) active status;

the second vehicle UE including a second transceiver configured to transmit and receive signals to vehicle UEs, and a second processor configured to control the second transceiver to receive the V2X message from the first vehicle UE, to determine whether the V2X message is transmitted to a third vehicle UE located in a coverage area, based on relaying information indicating whether the V2X message is relayed, and to control the second transceiver to transmit the V2X message to the third vehicle UE, upon determining that the V2X message is transmitted to the third vehicle UE; and the third vehicle UE including a third transceiver configured to transmit and receive signals to vehicle UEs, and a third processor configured to control the third transceiver to receive the V2X message from the second vehicle UE, wherein the relaying information includes at least one of active status information, relay probability information or residual life information.

* * * * *